US012786006B2

(12) United States Patent
Luo et al.

(10) Patent No.: US 12,786,006 B2
(45) Date of Patent: Nov. 3, 2026

(54) METHODS, NETWORK NODES, MEDIA FOR SUPPORTING ETHERNET BRIDGING ON USER PLANE

(71) Applicant: Telefonaktiebolaget LM Ericsson (publ), Stockholm (SE)

(72) Inventors: Ying Luo, Shanghai (CN); Yongfeng Xu, Shanghai (CN); György Miklós, Pilisborosjenö (HU); Ala Nazari, Handen (SE); Hongxia Long, Shanghai (CN); Stefan Rommer, Västra Frölunda (SE); Kun Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 251 days.

(21) Appl. No.: 18/832,112

(22) PCT Filed: Feb. 10, 2023

(86) PCT No.: PCT/EP2023/053274

§ 371 (c)(1),
(2) Date: Jul. 23, 2024

(87) PCT Pub. No.: WO2023/156295

PCT Pub. Date: Aug. 24, 2023

(65) Prior Publication Data

US 2025/0119317 A1 Apr. 10, 2025

(30) Foreign Application Priority Data

Feb. 15, 2022 (WO) ................ PCT/CN2022/076291

(51) Int. Cl.
*H04L 12/24* (2006.01)
*H04L 12/28* (2006.01)
(Continued)

(52) U.S. Cl.
CPC ........ *H04L 12/462* (2013.01); *H04L 12/2881* (2013.01); *H04L 12/46* (2013.01);
(Continued)

(58) Field of Classification Search
CPC ............... H04L 12/462; H04L 12/2881; H04L 12/4641; H04L 12/4645; H04L 12/467;
(Continued)

(56) References Cited

U.S. PATENT DOCUMENTS

| | | | | |
|---|---|---|---|---|
| 6,111,876 A * | 8/2000 | Frantz | H04L 12/4641 370/469 |
| 2008/0225755 A1* | 9/2008 | Ishizaki | H04L 12/4679 370/255 |

(Continued)

FOREIGN PATENT DOCUMENTS

| | | | |
|---|---|---|---|
| EP | 1227623 A2 * | 7/2002 | H04L 45/00 |
| WO | WO-2004032426 A1 * | 4/2004 | H04L 61/10 |

(Continued)

OTHER PUBLICATIONS

International Search Report and Written Opinion issued for PCT/EP2023/053274 mailed on May 17, 2023.

(Continued)

*Primary Examiner* — Ario Etienne
*Assistant Examiner* — Elizabeth Kassa
(74) *Attorney, Agent, or Firm* — Sonoda & Kobayashi Intellectual Property Law; Sarvajit S. Patil

(57) ABSTRACT

Methods, network nodes, and computer readable storage media for supporting Ethernet bridging in a user plane are disclosed. The method performed by a first network node capable of an Ethernet bridging function includes: obtaining information on frame detection and forwarding rules for an Ethernet PDU session; and performing detection and for-
(Continued)

warding operations on a frame according to the frame detection and forwarding rules.

20 Claims, 9 Drawing Sheets

(51) Int. Cl.
*H04L 12/46* (2006.01)
*H04L 41/0803* (2022.01)

(52) U.S. Cl.
CPC ...... *H04L 12/4641* (2013.01); *H04L 12/4645* (2013.01); *H04L 12/467* (2013.01); *H04L 12/4675* (2013.01); *H04L 12/4679* (2013.01); *H04L 12/4687* (2013.01)

(58) Field of Classification Search
CPC ............. H04L 12/4675; H04L 12/4679; H04L 12/4687; H04L 12/46
USPC .......................................................... 709/238
See application file for complete search history.

(56) References Cited

U.S. PATENT DOCUMENTS

| | | | | |
|---|---|---|---|---|
| 2010/0232412 | A1* | 9/2010 | Meier | H04L 12/4645 370/338 |
| 2018/0375763 | A1* | 12/2018 | Brissette | H04L 45/24 |
| 2022/0060970 | A1* | 2/2022 | Zhu | H04L 45/302 |
| 2022/0150166 | A1* | 5/2022 | Yang | H04L 12/4633 |
| 2025/0106291 | A1* | 3/2025 | Luo | H04W 28/10 |

FOREIGN PATENT DOCUMENTS

| | | | | | |
|---|---|---|---|---|---|
| WO | WO-2004042984 | A2 * | 5/2004 | | H04L 12/467 |
| WO | WO-2020148062 | A1 * | 7/2020 | | H04L 69/22 |

OTHER PUBLICATIONS

3rd Generation Partnership Project; Technical Specification Group Services and System Aspects; System architecture for the 5G System (5GS); Stage 2 (Release 17), 3GPP Draft; Interim_Draft_23501-H10_S2-144E_CRS_Implemented_5.30.2.4.2_H5, 3rd Generation Partnership Project (3GPP), Mobile Competence Centre ; 650, Route Des Lucioles ; F-06921 Sophia-Antipolis Cede, Apr. 23, 2021 (Apr. 23, 2021), XP052029388.

Orange et al: "Proper naming of the reference point between two UPFs for direct routing", 3GPP Draft; 23501_CR1028RI_VERTIC;I_LAN_(REL-16)_S2-19 03863 NI9, 3rd Generation Partnership Project (3GPP), Mobile Competence Centre; 650, Route Des Lucioles; F-06921 Sophia-Antipolis Cedex; France, vol. SA WG2, No. Xi'an, China; Apr. 8, 2019-Apr. 12, 2019, May 29, 2019 (May 29, 2019), XP051743305.

Nokia et al: "VLAN Information configuration and information exchange", 3GPP Draft; S2-2003173, 3rd Generation Partnership Project (3GPP), Mobile Competence Centre; 650, Route Des Lucioles; F-06921 Sophia-Antipolis Cedex; France, vol. SA WG2, No. Elbonia; Apr. 20, 2020-Apr. 23, 2020, Apr. 10, 2020 (Apr. 10, 2020), XP051874674.

Nokia et al: "5G LAN group communication with UPF autonomous traffic forwarding", 3GPP Draft; S2-1903312 5GLAN Disc Local Switch-V1, 3rd Generation Partnership Project (3GPP), Mobile Competence Centre; 650, Route Des Lucioles; F-06921 Sophia-Antipolis Cedex; France, vol. SA WG2, No. Xian, P.R. China; Feb. 8, 2019-Feb. 12, 2019, Apr. 2, 2019 (Apr. 2, 2019), XP051719475.

Juniper: "Enhancement on 5G-VN Group Communication", 3GPP Draft; S2-2000143, 3rd Generation Partnership Project (3GPP), Mobile Competence Centre; 650, Route Des Lucioles; F-06921 Sophia-Antipolis Cedex; France, vol. SA WG2, No. Jan. 13, 2020-Jan. 17, 2020, Jan. 5, 2020 (Jan. 5, 2020), XP052257793.

* cited by examiner

| | Bits | | | | | | | |
|---|---|---|---|---|---|---|---|---|
| Octets | 8 | 7 | 6 | 5 | 4 | 3 | 2 | 1 |
| 1 to 2 | Type = 134 (decimal) | | | | | | | |
| 3 to 4 | Length = n | | | | | | | |
| 5 | Spare | | | | | VID | DEI | PCP |
| 6 | C-VID value | | | | DEI Flag | PCP value | | |
| 7 | C-VID Value | | | | | | | |
| 8 to (n+4) | These octet(s) is/are present only if explicitly specified | | | | | | | |

| | Bits | | | | | | | |
|---|---|---|---|---|---|---|---|---|
| Octets | 8 | 7 | 6 | 5 | 4 | 3 | 2 | 1 |
| 1 to 2 | Type = 139 (decimal) | | | | | | | |
| 3 to 4 | Length = n | | | | | | | |
| 5 | Spare | | | | | | A/R Ind | BIDE |
| 6 to (n+4) | These octet(s) is/are present only if explicitly specified | | | | | | | |

METHODS, NETWORK NODES, MEDIA FOR SUPPORTING ETHERNET BRIDGING ON USER PLANE

CROSS-REFERENCE TO RELATED APPLICATIONS

This patent application is a submission under 35 U.S.C. § 371 for U.S. national stage patent application of international application no. PCT/EP2023/053274 filed on Feb. 10, 2023 and entitled "METHODS, NETWORK NODES, MEDIA FOR SUPPORTING ETHERNET BRIDGING ON USER PLANE," which claims priority to PCT/CN2022/076291 filed on Feb. 15, 2022, the entireties of both of which are incorporated herein by reference.

TECHNICAL FIELD

The present disclosure relates to wireless communications, and in particular, to methods, network nodes, and computer readable storage media for supporting Ethernet bridging in a user plane.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Institute of Electrical and Electronics Engineers (IEEE) 802.1Q defines Ethernet Bridges and bridged networks, where a bridge forwards Ethernet traffic based on Filtering Database (FDB). The FDB supports queries by the Forwarding Process to determine whether received frames, with given values of, destination Media Access Control (MAC) address, and for Virtual Local Area Network (VLAN) Bridge components, VLAN ID (also called 'VID', both of which are interchangeable herein), are to be forwarded through a given potential transmission port.

The FDB includes filtering entries and VLAN registration entries (as specified in IEEE 802.1Q-2018, Clause 8.8). The filtering entry has two types: static filtering entry and dynamic filtering entry. The VLAN registration entry also has two types: static VLAN registration entry and dynamic VLAN registration entry.

Default VLAN ID definition: The default VLAN (usually VID #1) is used by an Ethernet bridge as a default VLAN tagging for untagged incoming traffic (when there is no specific VLAN ID setting for the untagged traffic). VID #1 tagged VLAN can be used for control and management traffic and/or user plane traffic.

Although it has been proposed that the Ethernet Bridge function may be implemented in some Network Function (NF), such as User Plane Function (UPF), defined in 3rd Generation Partnership Project (3GPP), there are many problems to be solved in order to improve 5G System (5GS) Ethernet VLAN traffic forwarding.

For example, the current 3GPP specification doesn't specify details of how the UPF can forward Ethernet traffic based on UPF MAC learning results, without SMF explicitly configuring MAC address information in Packet Detection Rule(s) (PDR(s)).

In another aspect, although the current 3GPP specification allows the UPF to perform Ethernet traffic forwarding directly based on IEEE 802.1Q traffic forwarding information and VLAN configuration, it only supports static configuration (static filtering entry and static VLAN configuration). Furthermore, the current 3GPP specification doesn't describe details about how the UPF can support static forwarding.

In another aspect, when Ethernet downlink traffic is received on the N6 interface, if the MAC addresses are unknown to the SMF, the SMF cannot define a Packet Detection Rule/Forwarding Action Rule (PDR/FAR) rule to instruct the UPF for packet detection and forwarding in advance.

Furthermore, the current 3GPP specification doesn't specify how the 5G system can support an untagged VLAN frame.

In addition, an N19 tunnel is per 5G Virtual Network (VN) group granularity. Its establishment/releasing is upon Protocol Data Unit (PDU) Session setup/release. When there are different VLAN traffic running on the same N19 interface, if one VLAN is corresponding to one 5G VN group, it will need either multiple 5G VN Groups in the same N19 tunnel, or multiple N19 tunnels. The former case (multiple 5G VN Groups in the same N19 tunnel) is not supported in the current 3GPP TS 23.501 V17.2.0. For the latter case (multiple N19 tunnels), it is not efficient when there are a large number of VLANs on an N19 interface.

SUMMARY

In order to at least solve the problems as described above, the present disclosure proposes technical solutions for implementing packet/frame/frame detection and forwarding for Ethernet by:

- specifying, for involved Ethernet PDU sessions in the UPF (on N3, N6 and N19 interfaces), PDR/FAR rules with values of some Information Elements (IEs) and a new IE to configure the filtering entries of the FDB in the UPF, so that the UPF may detect Ethernet traffic with known or unknown MAC addresses, with or without certain VLAN tags, wherein for an inbound untagged (i.e., with no VLAN ID) frame, it is proposed that the 5G system assigns a default VLAN ID for the inbound untagged frame, and the default VLAN ID is removed when the frame leaves the 5G system,
- creating an N6 session to carry PDR/FAR rules for packet/frame/frame detection and forwarding on N6 interface,
- building the FDB in the UPF with both static and dynamic filtering entries and forwarding information,
- establishing an N19 session once the SMF is associated with a pair of UPFs, and enhancing the N19 session to transport multiple VLANs served by the pair of UPFs in one N19 session.

According to a first aspect of the present disclosure, a method at a first network node capable of an Ethernet bridging function is provided. The method includes:

- obtaining information on frame detection and forwarding rules for an Ethernet PDU session; and performing detection and forwarding operations on a frame according to the frame detection and forwarding rules,
- wherein the frame detection and forwarding rules includes at least one of:
- a pair of first inbound detection and forwarding rules and first outbound detection and forwarding rules, and a pair of second inbound detection and forwarding rules and second outbound detection and forwarding rules, wherein the first inbound detection and forwarding rules include:

a first inbound detection rule of detecting and accepting a received frame with no Virtual Local Area Network (VLAN) Identifier (ID), and a first inbound forwarding rule of assigning a default VLAN ID to the received frame with no VLAN ID and forwarding the frame assigned with the default VLAN ID to an internal interface of the first network node that is interfaced to the Ethernet bridging function, and a first outbound detection rule of detecting the frame with the default VLAN ID received from the internal interface and removing the default VLAN ID from the frame, and a first outbound forwarding rule of forwarding the detected frame to a destination interface; and wherein the second inbound detection and forwarding rules include:

a second inbound detection rule of detecting whether a received frame with a VLAN ID is accepted or rejected, and a second inbound forwarding rule of forwarding the accepted frame to the internal interface, and a second outbound detection rule of detecting the frame with the VLAN ID received from the internal interface, and a second outbound forwarding rule of forwarding the detected frame with the VLAN ID to a destination interface.

In an exemplary embodiment, the first inbound detection rule is a PDR, and is indicated by an Ethernet Packet Filter IE and a Source Interface IE, wherein the Ethernet Packet Filter IE includes a C-TAG IE indicating no VLAN ID and an Ethernet Filter Properties IE with an indicator indicating "Accept", and the Source Interface IE indicates a source interface from which the frame is received.

In an exemplary embodiment, the C-TAG IE with its VID flag set to 0 indicates no VLAN ID, and the indicator set to 0 indicates "Accept".

It is noted that, throughout this disclosure, when mentioning flags or indicators being set to specific values, like "0" or "1", this is meant exemplarily and does not mean that they are restricted to these particular values, nor to binary values. Rather, they are meant to be set to appropriate values for the respective indication and will be selected by the skilled person as required.

In an exemplary embodiment, the first inbound forwarding rule is an FAR, and is indicated by a Destination Interface IE and an Outer Header Creation IE, wherein the Outer Header Creation IE indicates the default VLAN ID for assigning to the received frame with no VLAN ID, and the Destination Interface IE indicates the internal interface to which the accepted frame is to be forwarded.

In an exemplary embodiment, the first outbound detection rule is a PDR, and is indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.

In an exemplary embodiment, the first outbound forwarding rule is an FAR, and is indicated by a Destination Interface IE, wherein the Destination Interface IE indicates the destination interface to which the detected frame is to be forwarded.

In an exemplary embodiment, the second inbound detection rule is a PDR, and is indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.

In an exemplary embodiment, in each Ethernet Packet Filter IE of the list, a C-TAG IE indicates a VLAN ID, and an Ethernet Filter Properties IE includes an indicator, which is set to 1 to indicate "Reject", or set to 0 to indicate "Accept".

In an exemplary embodiment, the second inbound detection rule follows negotiation based on Multiple VLAN Registration Protocol (MVRP), and is indicated by a Source Interface IE and an Ethernet Packet Filter IE, wherein the Source Interface IE indicates a source interface from which the frame is received, and the Ethernet Packet Filter IE includes an Ethernet Filter Properties IE with an indicator set to 1 to indicate "Reject" and a C-TAG IE is not present.

In an exemplary embodiment, the second inbound forwarding rule is an FAR, and is indicated by a Destination Interface IE, wherein the Destination Interface IE indicates the internal interface to which the accepted frame is to be forwarded.

In an exemplary embodiment, the second outbound detection rule is an PDR, and is indicated by a Source Interface IE indicates the internal interface from which the frame is received.

In an exemplary embodiment, the second outbound forwarding rule is an FAR, and is indicated by a Destination Interface IE, wherein the Destination Interface IE indicates the destination interface to which the detected frame with the VLAN ID is to be forwarded.

In an exemplary embodiment, the first network node is a UPF, wherein the internal interface is an UPF internal interface, and the Ethernet PDU session for which the information on frame detection and forwarding rules are obtained includes at least one of:

an N6 Ethernet PDU session between an N6 interface and the UPF internal interface, an N3 Ethernet PDU Session between an N3 interface and the UPF internal interface, and an N19 Ethernet PDU Session between an N19 interface and the UPF internal interface.

In an exemplary embodiment, the Source Interface IE indicates a Core Interface for the N6 or N19 Ethernet PDU Session, and the Source Interface IE indicates an Access Interface for the N3 Ethernet PDU Session.

In an exemplary embodiment, the Destination Interface IE indicates a Core Interface for the N6 or N19 Ethernet PDU Session, and the Destination Interface IE indicates an Access Interface for the N3 Ethernet PDU Session.

In an exemplary embodiment, the N6 Ethernet PDU session is established by the UPF based on local pre-configuration, and the frame detection and forwarding rules for the N6 Ethernet PDU session are pre-configured in the UPF.

In an exemplary embodiment, the N6/N3/N19 Ethernet PDU session is established by an SMF, and the method further includes: receiving, from the SMF, an indication of establishing the N6/N3/N19 Ethernet PDU session, which at least includes an indication of a Packet Data Network (PDN) type being Ethernet, and the information on frame detection and forwarding rules.

In an exemplary embodiment, the indication of establishing the N6/N3/N19 Ethernet session is received from the SMF via an N4 Session Setup procedure.

In an exemplary embodiment, the information on frame detection and forwarding rules includes at least one of:

a pre-configured rule name referring to the frame detection and forwarding rules that are pre-configured in the UPF, or the at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

In an exemplary embodiment, in the first inbound detection rule and the second inbound detection rule for the established N19 or N3 Ethernet PDU session, an Outer Header Removal IE set to "General Packet Radio Service Tunneling Protocol-User plane (GTP-U)/User Datagram Protocol (UDP)/Internet Protocol version 4 (IPv4)" indicates to remove a GTP header from the received frame before the received frame is detected.

In an exemplary embodiment, in the first outbound forwarding rule and the second outbound forwarding rule for the established N19 or N3 Ethernet PDU session, an Outer Header Creation IE set to "GTP-U/UDP/IPv4" indicates to add a GTP header to the detected frame before the detected frame is forwarded.

In an exemplary embodiment, the N19 Ethernet PDU session is established by the SMF via an N4 Session Setup procedure, and the method further includes: once the SMF is respectively associated with UPFs in a pair of UPFs including the UPF, receiving, from the SMF, an indication of establishing the N19 Ethernet PDU session per pair of UPFs for transmitting multiple VLANs in the N19 Ethernet PDU session.

In an exemplary embodiment, the Ethernet bridging function is implemented based on an FDB in the UPF, and includes at least one of:

a filtering operation function for detecting whether to accept or reject a frame, a VLAN operation function for assigning/removing a VLAN ID to/from a frame, and a forwarding operation function for forwarding L2 Ethernet traffic in a format of frames.

In an exemplary embodiment, the FDB specifies correspondence among MAC addresses, VLAN IDs, and Session IDs, and is built for the Ethernet bridging function by at least one of:

pre-configuration of the UPF;

receiving, from an SMF, the frame detection and forwarding rules with MAC address(es) and/or VLAN ID(s) for populating the FDB with the MAC address(es) and/or VLAN ID(s) via an N4 Session Setup procedure;

learning and recording MAC address(es) and/or VLAN ID(s) of received frame(s) for populating the FDB with the MAC address(es) and/or VLAN ID(s);

detecting and reporting MAC address(es) and/or VLAN ID(s) of received frame(s) to the SMF, and receiving, from the SMF, the MAC addresses and/or VLAN ID(s) for populating the FDB with the MAC address(es) and/or VLAN ID(s) via an N4 Session Modification procedure.

In an exemplary embodiment, the internal interface is a "5G VN Internal" interface.

According to a second aspect of the present disclosure, a method at a second network node is provided. The method includes: transmitting, to a first network node capable of an Ethernet bridging function, an indication of establishing an Ethernet PDU session, which at least includes an indication of a PDN type being Ethernet, and information on frame detection and forwarding rules for the Ethernet PDU session, the frame detection and forwarding rules being used for the first network node to perform detection and forwarding operations on a frame, wherein the frame detection and forwarding rules includes at least one of:

a pair of first inbound detection and forwarding rules and first outbound detection and forwarding rules, and a pair of second inbound detection and forwarding rules and second outbound detection and forwarding rules, wherein the first inbound detection and forwarding rules include:

a first inbound detection rule of detecting and accepting a received frame with no VLAN ID, and a first inbound forwarding rule of assigning a default VLAN ID to the received frame with no VLAN ID and forwarding the frame assigned with the default VLAN ID to an internal interface of the first network node that is interfaced to the Ethernet bridging function, and a first outbound detection rule of detecting the frame with the default VLAN ID received from the internal interface and removing the default VLAN ID from the frame, and a first outbound forwarding rule of forwarding the detected frame to a destination interface; and wherein the second inbound detection and forwarding rules include:

a second inbound detection rule of detecting whether a received frame with a VLAN ID is accepted or rejected, and a second inbound forwarding rule of forwarding the accepted frame to the internal interface, and a second outbound detection rule of detecting the frame with the VLAN ID received from the internal interface, and a second outbound forwarding rule of forwarding the detected frame with the VLAN ID to a destination interface.

In an exemplary embodiment, the first inbound detection rule is a PDR, and is indicated by an Ethernet Packet Filter IE and a Source Interface IE, wherein the Ethernet Packet Filter IE includes a C-TAG IE indicates no VLAN ID and an Ethernet Filter Properties IE with an indicator indicating "Accept", and the Source Interface IE indicates a source interface from which the frame is received.

In an exemplary embodiment, the C-TAG IE with its VID flag set to 0 indicates no VLAN ID, and the indicator set to 0 indicates "Accept".

In an exemplary embodiment, the first inbound forwarding rule is an FAR, and is indicated by a Destination Interface IE and an Outer Header Creation IE, wherein the Outer Header Creation IE indicates the default VLAN ID for assigning to the received frame with no VLAN ID, and the Destination Interface IE indicates the Internal Interface to which the accepted frame is to be forwarded.

In an exemplary embodiment, the first outbound detection rule is a PDR, and is indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.

In an exemplary embodiment, the first outbound forwarding rule is an FAR, and is indicated by a Destination Interface IE, wherein the Destination Interface IE indicates the destination Interface to which the detected frame is to be forwarded.

In an exemplary embodiment, the second inbound detection rule is a PDR, and is indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.

In an exemplary embodiment, in each Ethernet Packet Filter IE of the list, a C-TAG IE indicates a VLAN ID, and an Ethernet Filter Properties IE includes an indicator, which is set to 1 to indicate "Reject", or set to 0 to indicate "Accept".

In an exemplary embodiment, the second inbound detection rule follows negotiation based on MVRP, and is indicated by a Source Interface IE and an Ethernet Packet Filter IE, wherein the Source Interface IE indicates a source interface from which the frame is received, and the Ethernet Packet Filter IE includes an Ethernet Filter Properties IE with an indicator set to 1 to indicate "Reject" and a C-TAG IE is not present.

In an exemplary embodiment, the second inbound forwarding rule is an FAR, and is indicated by a Destination Interface IE, wherein the Destination Interface IE indicates the internal interface to which the accepted frame is to be forwarded.

In an exemplary embodiment, the second outbound detection rule is an PDR, and is indicated by a Source Interface IE indicates the internal interface from which the frame is received.

In an exemplary embodiment, the second outbound forwarding rule is an FAR, and is indicated by a Destination Interface IE, wherein the Destination Interface IE indicates the destination interface to which the detected frame with the VLAN ID is to be forwarded.

In an exemplary embodiment, the first network node is a UPF, and the second network node is an SMF,

- wherein the internal interface is an UPF internal interface, and the Ethernet PDU session for which the information on frame detection and forwarding rules are obtained includes at least one of:
- an N6 Ethernet PDU session between an N6 interface and the UPF internal interface,
- an N3 Ethernet PDU Session between an N3 interface and the UPF internal interface, and
- an N19 Ethernet PDU Session between an N19 interface and the UPF internal interface.

In an exemplary embodiment, the Source Interface IE indicates a Core Interface for the N6 or N19 Ethernet PDU Session, and the Source Interface IE indicates an Access Interface for the N3 Ethernet PDU Session.

In an exemplary embodiment, the Destination Interface IE indicates a Core Interface for the N6 or N19 Ethernet PDU Session, and the Destination Interface IE indicates an Access Interface for the N3 Ethernet PDU Session.

In an exemplary embodiment, the N6/N3 Ethernet PDU session is established by the SMF via an N4 Session Setup procedure, wherein the transmitting further includes: transmitting, to the UPF, an indication of establishing the N6/N3 Ethernet PDU session, which at least includes the indication of the PDN type being Ethernet, and the information on frame detection and forwarding rules.

In an exemplary embodiment, the N19 Ethernet PDU session is established by the SMF via an N4 Session Setup procedure, wherein the transmitting further includes: respectively transmitting, to a pair of UPFs including the UPF, an indication of establishing the N19 Ethernet PDU session, which at least includes the indication of the PDN type being Ethernet, and the information on frame detection and forwarding rules.

In an exemplary embodiment, the indication of establishing the N19 Ethernet PDU session indicates to establish the N19 Ethernet PDU session per pair of UPFs for transmitting multiple VLANs in the N19 Ethernet PDU session, and is transmitted by the SMF once the SMF is respectively associated with the UPFs in the pair of UPFs.

In an exemplary embodiment, the information on frame detection and forwarding rules includes at least one of:

- a pre-configured rule name referring to the frame detection and forwarding rules that are pre-configured in the UPF, or
- the at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

In an exemplary embodiment, in the first inbound detection rule and the second inbound detection rule for the established N19 or N3 Ethernet PDU session, an Outer Header Removal IE set to "GTP-U/UDP/IPv4" indicates to remove a GTP header from the received frame before the received frame is detected.

In an exemplary embodiment, in the first outbound forwarding rule and the second outbound forwarding rule for the established N19 or N3 Ethernet PDU session, an Outer Header Creation IE set to "GTP-U/UDP/IPv4" indicates to add a GTP header to the detected frame before the detected frame is forwarded.

In an exemplary embodiment, the internal interface is a "5G VN Internal" interface.

According to a third aspect of the present disclosure, a first network node capable of an Ethernet bridging function is provided. The first network node includes: at least one processor, and at least one memory, storing instructions which, when executed on the at least one processor, cause the first network node to perform any of the methods according to the first aspect of the present disclosure.

According to a fourth aspect of the present disclosure, a second network node is provided. The second network node includes: at least one processor, and at least one memory, storing instructions which, when executed on the at least one processor, cause the second network node to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform any of the methods according to any of the first to second aspects of the present disclosure.

The technical solutions according to the exemplary embodiments of the present disclosure as described above may achieve at least beneficial effects as follows.

The technical solutions according to the exemplary embodiments of the present disclosure specify detailed data plane solutions about how the UPF can forward Ethernet traffic based on UPF MAC learning results, without the SMF explicitly configuring MAC address information in PDR/

FAR, i.e., specify how the UPF can achieve routing/forwarding in all direction based on either static filtering entry or dynamic filtering entry.

Furthermore, the technical solutions according to the exemplary embodiments of the present disclosure may support both static and dynamic VLAN configuration, and may be used for both static and dynamic filtering entry.

In addition, the technical solutions according to the exemplary embodiments of the present disclosure create an N6 Ethernet PDU session where PDR/FAR rules can be installed in the UPF for downlink Ethernet frame detection and forwarding, so that the UPF may detect Ethernet traffic with known or unknown MAC addresses, with or without certain VLAN tags.

The technical solutions according to the exemplary embodiments of the present disclosure specify that the 5G system may assign a default VLAN ID for an inbound untagged frame; and when the frame leaves the 5G system, the default VLAN ID may be removed. Furthermore, the technical solutions according to the exemplary embodiments of the present disclosure specify exemplary PDR/FAR structures with values of some IEs and a new IE to configure the filtering entries of the FDB in the UPF.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
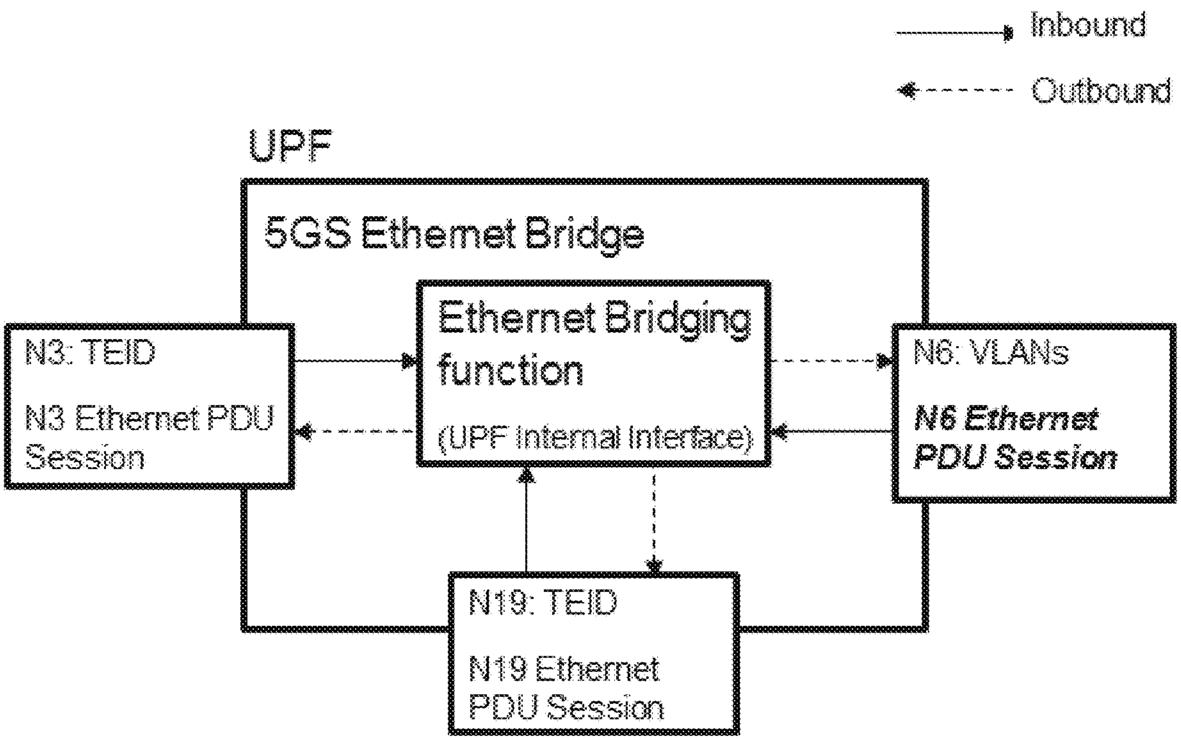
FIG. 1 schematically shows a data plane forwarding model in which exemplary embodiments of the present disclosure may be applied.

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may make reference to the following documents, which are incorporated herein in their entirety by reference:

IEEE Standard 802.1Q™-2018, "IEEE Standard for Local and Metropolitan Area Network-Bridges and Bridged Networks", 2018-05;

3GPP TS 23.501 V17.2.0, "3rd Generation Partnership Project; Technical Specification Group Services and System Aspects; System architecture for the 5G System (5GS); Stage 2 (Release 17)", 2021-09; and 3GPP TS 29.244 V17.2.0, "3rd Generation Partnership Project; Technical Specification Group Core Network and Terminals; Interface between the Control Plane and the User Plane Nodes; Stage 3 (Release 17)", 2021-09.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" refers to a device in a wireless communication network via which a terminal device or another network node accesses the network and receives services therefrom. The network node refers to any Network Function (NF), a base station (BS), an access point (AP), or any other suitable device in the wireless communication network. The BS may be, for example, a node B (NodeB or NB), an evolved NodeB (cNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

In some embodiments, the non-limiting terms wireless device or UE are used interchangeably. The UE herein can be any type of wireless device capable of communicating with a network node or another wireless device over radio signals, such as wireless device. The UE may also be a radio communication device, target device, D2D wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Note that although terminology from one particular wireless system, such as, for example, 3GPP LTE and/or New Radio (NR), may be used in this disclosure, this should not be seen as limiting the scope of the present disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or a network node may be distributed over a plurality of UEs and/or network nodes. In other words, it is contemplated that the functions of the network node and UE described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In 3GPP, there are different options for 5G system to handle Ethernet VLAN traffic.

Option 1: Session Management Function (SMF) Controlled VLAN Handling and Traffic Forwarding Clause 5.6.10.2 of 3GPP TS 23.501 V17.2.0 specifies that "The SMF may receive a list of allowed VLAN tags from Data Network-Authentication, Authorization and Accounting (DN-AAA) (for a maximum of 16 VLAN tags) or may be locally configured with allowed VLAN tags values. The SMF may also be configured with instructions on VLAN handling (e.g., the VLAN tag to be inserted or removed, Service-TAG (S-TAG) to be inserted or removed). Taking this into account, the SMF determines the VLAN handling for the PDU Session and instructs the UPF to accept or discard the User Equipment (UE) traffic based on the allowed VLAN tags, as well as to handle VLAN tags (addition/removal) via PDR (Outer Header Removal) and FAR (UPF applying Outer Header Creation of a Forwarding policy)."

It is observed that the SMF determines VLAN rules, and instructs the VLAN rules to the UPF as a part of PDR and FAR; and the UPF performs VLAN filtering (i.e. accept or discard traffic based on VLAN) and tagging operation (i.e. insert and/or remove VLAN tags, i.e., VLAN IDs) based on the VLAN handling rules in PDR and FAR.

Clause 5.8.2.13 of 3GPP TS 23.501 V17.2.0 specifies that "Traffic forwarding within the 5G VN group is realized by using a UPF internal interface ("5G VN internal") and a two-step detection and forwarding process. In the first step, the packets received from any 5G VN group member (via it's PDU Session, via N6 or via N19) are forwarded to the UPF internal interface (i.e. Destination Interface set to "5G VN internal"). In the second step, PDRs installed at the UPF internal interface (i.e. Source Interface set to "5G VN internal") detect the packet and forward it to the respective 5G VN group member (via its PDU Session, via N6 or via N19). The details of the PDR and FAR configuration are described in the following clauses."

Forwarding Ethernet unicast traffic towards the PDU Session corresponding to the Destination MAC address of an Ethernet frame may correspond:

- either to the SMF explicitly configuring DL PDR(s) with the MAC addresses detected by the UPF on PDU Sessions and reported to the SMF; this is further described in Clause 5.8.2.13.1 of 3GPP TS 23.501 V17.2.0;
- or to the SMF relying on MAC address learning in UPF as defined in Clause 5.8.2.5.3 of 3GPP TS 23.501 V17.2.0. To request this UPF behavior, the SMF sets the Ethernet PDU Session Information indication in the DL PDR of the "5G VN internal" interface related with a 5G VN group. This may apply in the case that all PDU Sessions related with this 5G VN group are served by the same PDU Session Anchor (PSA) or by multiple PSAs not inter-connected via N19.

It is observed that there are two different solutions in 3GPP TS 23.501 V17.2.0 for forwarding Ethernet traffic.

Alternative 1:

SMF determines forwarding of Ethernet traffic, and forwarding information with MAC addresses are integrated in the PDR and FAR rules. UPF performs traffic forwarding based on PDR and FAR.

Alternative 2:

UPF can perform MAC learning. Then, SMF relies on UPF to forward traffic based on MAC learning results. However, the current 3GPP TS 23.501 V17.2.0 doesn't specify details.

Option 2: UPF Ethernet Traffic Forwarding Based on IEEE Filtering and Forwarding Information Clause 5.8.2.5.3 of 3GPP TS 23.501 V17.2.0 specifies that "The UPF/Network-Time Sensitive Network (TSN) Translator (NW-TT) may also be provided with static filtering entries as described in clause 5.28.3. How the UPF uses the static filtering entry to achieve routing in all direction is "up to UPF implementation". The externally observable behavior of 5GS Bridge needs to comply with IEEE Std 802.1Q."

Clause 5.28.1 of 3GPP TS 23.501 V17.2.0 specifies that "The TSN Application Function (AF) also stores the information about ports on the UPF/NW-TT side. The UPF/NW-TT forwards traffic to the appropriate egress port based on the traffic forwarding information."

Clause 5.28.2 of 3GPP TS 23.501 V17.2.0 specifies that "Traffic forwarding information as defined in Clause 8.8.1 of IEEE Std 802.1Q: Destination MAC address and VLAN ID of TSN stream; Port number in the Port MAP as defined in Clause 8.8.1 of IEEE Std 802.1Q."

Clause 8.8 of IEEE Std 802.1Q-2018 defines two types of filtering database that are used by traffic forwarding process: static filtering entries, and dynamic filtering entries.

Clause 5.28.3.3 of 3GPP TS 23.501 V17.2.0 specifies that "The Centralized Network Configuration (CNC) obtains the 5G System (5GS) bridge VLAN configuration from TSN AF according to IEEE Std 802.1Q clause 12.10.1.1. The TSN AF and UPF/NW-TT are pre-configured with same 5GS bridge VLAN configuration.

NOTE: In this Release, the VLAN Configuration Information is pre-configured at the TSN AF and the NW-TT and is not exchanged between the TSN AF and the UPF/NW-TT."

It is observed that

- the current specification 3GPP TS 23.501 V17.2.0 allows UPF to perform Ethernet traffic forwarding directly based on IEEE 802.1Q traffic forwarding information and VLAN configuration (without SMF provided VLAN handling rules and forwarding rules in PDR/FAR);
- according to the current specification 3GPP TS 23.501 V17.2.0, VLAN configuration is statically pre-configured at UPF/NW-TT and TSN AF;
- so far, only IEEE traffic forwarding information using static filtering entries is supported.
- although the feature of UPF forwarding traffic based on IEEE traffic forwarding information is defined in "support of integration with TSN" section of 3GPP TS 23.501 V17.2.0, it is applicable also to other generic Ethernet traffic, as Clause 8.8 of IEEE 802.1Q-2018 applies on all MAC bridges and virtual bridged local area networks.
- the current 3GPP specification doesn't specify how the UPF can use the static filtering entry to achieve routing in all direction.

Clause 5.29.4 of 3GPP TS 23.501 V17.2.0 specifies that 'The N19 tunnel(s) can be established between a new UPF and other UPF(s) that belongs to a 5G VN group when the new UPF is selected for the 5G VN group during PDU session establishment. The N19 tunnel(s) can be released during or after PDU session release when there is no more PDU sessions for a 5G VN group in that UPF. Establishment or release of the N19 tunnels at the UPF is performed within a group-level N4 Session."

It is observed that the N19 tunnel is per 5G VN group granularity. Its establishment/releasing is upon PDU Session setup/release.

In order to that the UPF can forward Ethernet traffic based on UPF MAC learning results, without SMF explicitly configuring MAC address information in PDR(s), the basic ideas of the present disclosure mainly consist in:

- specifying, for involved Ethernet PDU sessions in the UPF (on N3, N6 and N19 interfaces), PDR/FAR rules with values of some IEs and a new IE to configure the filtering entries of the FDB in the UPF, so that the UPF may detect Ethernet traffic with known or unknown MAC addresses, with or without certain VLAN tags, wherein for an inbound untagged (i.e., with no VLAN ID) frame, it is proposed that the 5G system assigns a default VLAN ID for the inbound untagged frame, and the default VLAN ID is removed when the frame leaves the 5G system,
- creating an N6 session to carry PDR/FAR rules for packet/frame/frame detection and forwarding on N6 interface,
- building the FDB in the UPF with both static and dynamic filtering entries and forwarding information,
- establishing an N19 session once the SMF is associated with a pair of UPFs, and enhancing the N19 session to transport multiple VLANs served by the pair of UPFs in one N19 session.

Hereinafter, a data plane forwarding model in which exemplary embodiments of the present disclosure may be applied will be described in conjunction with FIG. 1.

FIG. 1 schematically shows a data plane forwarding model in which exemplary embodiments of the present disclosure may be applied, wherein N3 is an interface between Access Network (AN) and UPF, N6 is an interface between UPF and DN, and N19 is an interface between UPFs (PSAs). In addition, N4 (not shown) is an interface between SMF and UPF.

The definition of 5GS bridge follows Clause 5.28.1 of 3GPP TS 23.501 V17.2.0, where the 5G system acts as an L2 Ethernet bridge (i.e., an IEEE Ethernet bridge). As shown in FIG. 1, the UPF includes a 5GS Ethernet Bridge, and is capable of an Ethernet bridging function.

The Ethernet bridging function (which can be a UPF internal interface) is contained in the 5GS Ethernet bridge, and is implemented based on a FDB (e.g. filtering entry and VLAN registration entry) in the UPF. The Ethernet bridging function includes at least one of:

- a filtering operation function for detecting whether to accept or reject a frame,
- a VLAN operation function for assigning/removing a VLAN ID to/from a frame, and
- a forwarding operation function for forwarding L2 Ethernet traffic in a format of frames.

Note: An exemplary implementation of the UPF internal interface may be "5G VN internal" interface as defined in 3GPP TS 23.501 V17.2.0.

The inbound interface for 5GLAN Ethernet traffic is where the packet/frame arrives in the UPF, which may be e.g., N3, N6, or N19. The outbound interface for 5GLAN Ethernet traffic is where the packet/frame leaves the UPF, which may be e.g., N3, N6, or N19, either.

The procedure in the UPF to deliver a 5GLAN Ethernet frame from the inbound interface to outbound interface contains two steps:

the first step (detection step) is between the inbound interface (e.g., N3, N6, or N19) and the 5G Ethernet Bridging function, and the second step (forward step) is between the 5G Ethernet Bridging function and the outbound interface (e.g., N3, N6, or N19).

For the detection step, the PDR/FAR rules of the session identify/filter the inbound traffic and direct the traffic to 5G Ethernet Bridging function. The Ethernet Bridging function queries the FDB to find the session to outbound interface for the forwarding step. For the forwarding step, the PDR/FAR of the session indicates the destination interface. On either inbound or outbound interface, traffic can be measured and reported according to Usage Reporting Rule (URR) rule.

Each step should bind to an "Ethernet PDU session" as follows, so that the UPF may act upon the PDR/FAR rules linked to the Ethernet PDU session.

Hereinafter, a method 200 performed by a first network node capable of an Ethernet bridging function for frame detection and forwarding on a user plane according to an exemplary embodiment of the present disclosure will be described with reference to FIG. 2.

In an exemplary embodiment, the first network node may be a UPF capable of an Ethernet bridging function. It should be understood that the first network node may also be any other appropriate entity that can be configured to perform the method 200 as described below, including a virtualized entity that may be implemented on cloud.

Figure 2:
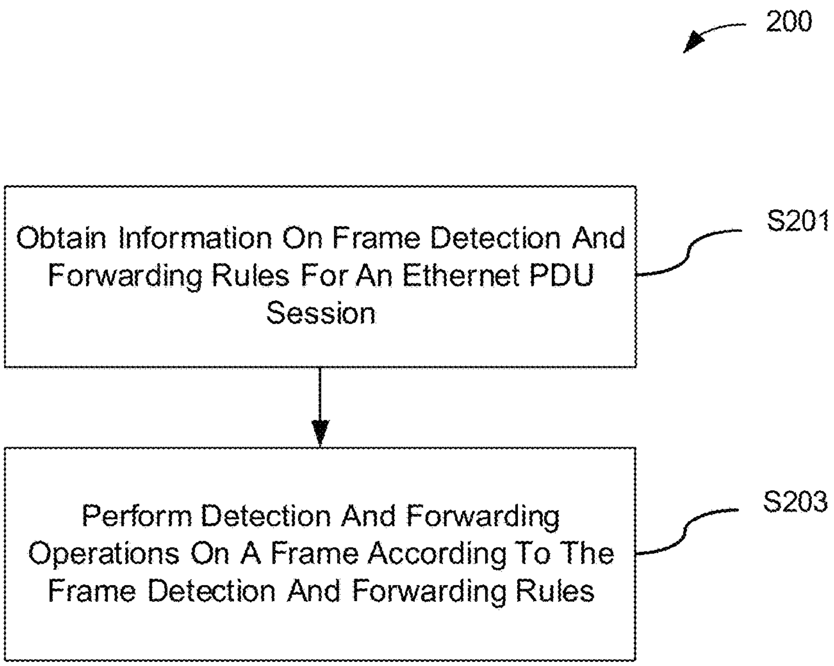
FIG. 2 schematically shows a method performed by a first network node capable of an Ethernet bridging function for frame detection and forwarding on a user plane according to an exemplary embodiment of the present disclosure.

As shown in FIG. 2, the method 200 may include at least steps S201 and S203.

In step S201, the UPF may obtain information on frame detection and forwarding rules for an Ethernet PDU session.

The frame detection and forwarding rules may include at least one of:

a pair of first inbound detection and forwarding rules and first outbound detection and forwarding rules, and a pair of second inbound detection and forwarding rules and second outbound detection and forwarding rules.

The first inbound detection and forwarding rules may include:

a first inbound detection rule of detecting and accepting a received frame with no VLAN ID, and a first inbound forwarding rule of assigning a default VLAN ID to the received frame with no VLAN ID and forwarding the frame assigned with the default VLAN ID to an internal interface of the first network node that is interfaced to the Ethernet bridging function, and a first outbound detection rule of detecting the frame with the default VLAN ID received from the internal interface and removing the default VLAN ID from the frame, and a first outbound forwarding rule of forwarding the detected frame to a destination interface; and The second inbound detection and forwarding rules may include:

a second inbound detection rule of detecting whether a received frame with a VLAN ID is accepted or rejected, and a second inbound forwarding rule of forwarding the accepted frame to the internal interface, and a second outbound detection rule of detecting the frame with the VLAN ID received from the internal interface, and a second outbound forwarding rule of forwarding the detected frame with the VLAN ID to a destination interface.

In step S203, the UPF may perform detection and forwarding operations on a frame according to the frame detection and forwarding rules.

Figures 8, 9, 10:
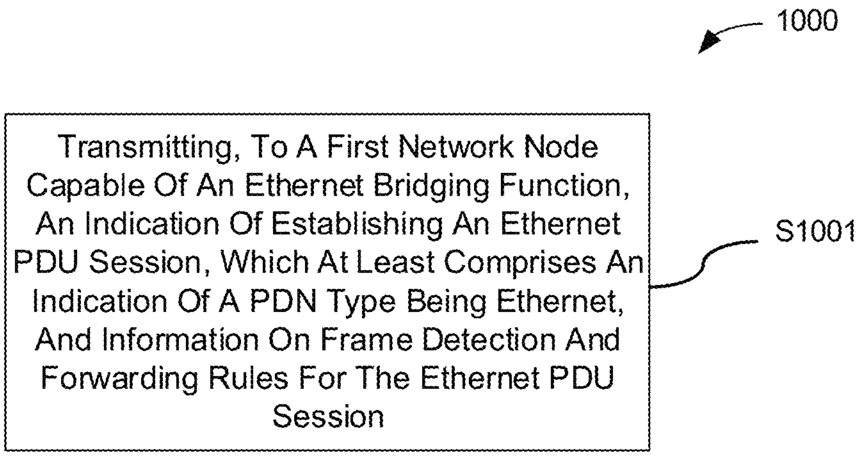
FIG. 8 schematically shows an encoded structure of a C-TAG IE in an exemplary PDR/FAR structure according to an exemplary embodiment of the present disclosure.
FIG. 9 schematically shows an exemplary encoded structure of an Ethernet Filter Properties IE in an exemplary PDR/FAR structure according to an exemplary embodiment of the present disclosure.
FIG. 10 schematically shows a method performed by a second network node for supporting frame detection and forwarding in a user plane according to an exemplary embodiment of the present disclosure.

In an exemplary embodiment, the first inbound detection rule may be a PDR, and may be indicated by an Ethernet Packet Filter IE and a Source Interface IE, wherein the Ethernet Packet Filter IE includes a C-TAG IE (encoded as shown in FIG. 8, which will be described later) indicating no VLAN ID (i.e., "untagged") and an Ethernet Filter Properties IE (encoded as shown in FIG. 9, which will be described later) with an indicator indicating "Accept", and the Source Interface IE indicates a source interface from which the frame is received.

For example, the C-TAG IE with its VID flag set to 0 may indicate no VLAN ID, and the indicator set to 0 may indicate "Accept".

In an exemplary embodiment, the first inbound forwarding rule may be an FAR, and may be indicated by a Destination Interface IE and an Outer Header Creation IE, wherein the Outer Header Creation IE indicates the default VLAN ID for assigning to the received frame with no VLAN ID, and the Destination Interface IE indicates the internal interface to which the accepted frame is to be forwarded.

The exemplary first inbound detection rule and first inbound forwarding rule may refer to 4_IN1 in FIG. 4, 5_IN1 in FIG. 5, or 7_IN1 in FIG. 7, which will be described later.

In an exemplary embodiment, the first outbound detection rule may be a PDR, and may be indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.

In an exemplary embodiment, the first outbound forwarding rule may be an FAR, and may be indicated by a Destination Interface IE, wherein the Destination Interface IE indicates the destination interface to which the detected frame is to be forwarded.

The exemplary first outbound detection rule and first outbound forwarding rule may refer to 4_OUT1 in FIG. 4, 5_OUT1 in FIG. 5, or 7_OUT1 in FIG. 7, which will be described later.

In an exemplary embodiment, the second inbound detection rule may be a PDR, and may be indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.

In each Ethernet Packet Filter IE of the list, a C-TAG IE indicates a VLAN ID, and an Ethernet Filter Properties IE includes an indicator, which is set to 1 to indicate "Reject", or set to 0 to indicate "Accept". Thus, the VLAN ID indicted by the C-TAG IE with the indicator set to 1 is a member of a Blacklist (BL), or the VLAN ID indicted by the C-TAG IE with the indicator set to 0 is a member of a Whitelist (WL).

As such, all VLAN IDs with the indicator set to 1 compose the BL, or all VLAN IDs with the indicator set to 0 compose the WL.

The exemplary second inbound detection rule may refer to 4_IN2 in FIG. 4, or 5_IN2 in FIG. 5, which will be described later. It should be understood that BL/WL may also be used for Ethernet Packet Filter IEs in 7_IN2 of FIG. 7, although not shown.

Alternatively, the second inbound detection rule may follow negotiation based on MVRP, and may be indicated by a Source Interface IE and an Ethernet Packet Filter IE, wherein the Source Interface IE indicates a source interface from which the frame is received, and the Ethernet Packet Filter IE includes an Ethernet Filter Properties IE with an indicator set to 1 to indicate "Reject" and a C-TAG IE is not present, which may refer to 7_IN2 in FIG. 7, which will be described later. It should be understood that the Ethernet Packet Filter IE including an Ethernet Filter Properties IE with an indicator set to 1 to indicate "Reject" and a C-TAG IE not present may also be used for Ethernet Packet Filter IE in 4_IN2 in FIG. 4, or 5_IN2 in FIG. 5, although not shown.

In an exemplary embodiment, the second inbound forwarding rule may be an FAR, and may be indicated by a Destination Interface IE, wherein the Destination Interface IE indicates the internal interface to which the accepted frame is to be forwarded.

The exemplary second inbound forwarding rule may refer to 4_IN2 in FIG. 4, 5_IN2 in FIG. 5, or 7_IN2 in FIG. 7, which will be described later.

In an exemplary embodiment, the second outbound detection rule may be a PDR, and may be indicated by a Source Interface IE indicates the internal interface from which the frame is received.

In an exemplary embodiment, the second outbound forwarding rule may be an FAR, and may be indicated by a Destination Interface IE, wherein the Destination Interface IE indicates the destination interface to which the detected frame with the VLAN ID is to be forwarded.

The exemplary second outbound detection rule and second outbound forwarding rule may refer to 4_OUT2 in FIG. 4, 5_OUT2 in FIG. 5, or 7_OUT2 in FIG. 7, which will be described later.

The C-TAG represents a Customer-VLAN tag, and the C-TAG IE shall contain the C-TAG as defined in IEEE 802.1Q-2018.

FIG. 8 schematically shows an encoded structure of a C-TAG IE in an exemplary PDR/FAR structure according to an exemplary embodiment of the present disclosure.

As shown in FIG. 8, the following flags are coded within Octet 5:

- Bit 1—PCP (Priority Code Point): If this bit is set to "1", then PCP Value field shall be used by the receiver, otherwise the PCP Value field shall be ignored.
- Bit 2—DEI (Drop Eligible Indicator): If this bit is set to "1", then DEI flag field shall be used by the receiver, otherwise the DEI flag field shall be ignored.
- Bit 3—VID (VLAN ID): If this bit is set to "1", then C-VID value field shall be used by the receiver, otherwise the VID Value field shall be ignored.
- Bit 4 to 8—spare and reserved for future use.

In order to detect a VLAN tagged or untagged Ethernet frame, a C-TAG IE as defined in 3GPP TS 29.244 V17.2.0 may be used. In an example, the "Bit 3-VID" flag bit in the C-TAG IE as shown in FIG. 8 may be set to "0" for an untagged frame (i.e., with no VLAN ID).

In an example, the "Bit 3-VID" flag bit in the C-TAG IE as shown in FIG. 8 may be set to "1" for a VLAN tagged frame (i.e., with a VLAN ID).

As such, the network that has both VLAN aware devices and VLAN unaware devices can be supported.

FIG. 9 schematically shows an exemplary encoded structure of an Ethernet Filter Properties IE in an exemplary PDR/FAR structure according to an exemplary embodiment of the present disclosure. Different from the current encoded structure of an Ethernet Filter Properties IE, a new indicator (A/R Indicator) represented as "ARIND" is defined in Ethernet Filter Properties IE to indicate "Accept" (e.g., set to 0), or "Reject" (e.g., set to 1).

As shown in FIG. 9, the following flags are coded within Octet 5:

- Bit 1—BIDE (Bidirectional Ethernet Filter): If this bit is set to "1", then the Ethernet Filter identified by the Ethernet Filter ID is bidirectional.
- Bit 2—ARIND (Accept/Reject Indicator): if this bit is set to "1", the detected Ethernet frame is rejected (dropped); otherwise, it is accepted.
- Bit 3 to 8—spare and reserved for future use.

As previously described, the first network node may be a UPF. Accordingly, the internal interface may be an UPF internal interface.

The Ethernet PDU session for which the information on frame detection and forwarding rules may be obtained may include at least one of:

- an N6 Ethernet PDU session between an N6 interface and the UPF internal interface,
- an N3 Ethernet PDU Session between an N3 interface and the UPF internal interface, and
- an N19 Ethernet PDU Session between an N19 interface and the UPF internal interface.

It should be understood that the Ethernet PDU session needs to be established so as to carry the detection and forwarding rules (e.g., PDRs/FARs) for the detection and forwarding operations on the frames over the corresponding interface. The current 3GPP specifications have specified the establishment procedure of the N3 Ethernet PDU Session or the N19 Ethernet PDU session, but there is no N6 Ethernet PDU session specified in the current 3GPP specifications. The detection step on the N6 inbound interface is impossible, if the MAC addresses are unknown to the SMF and the UPF.

To solve the problem, an establishment procedure of an "N6 ETHERNET PDU session" on the N6 interface is introduced, so as to carry the detection and forwarding rules (e.g., PDRs/FARs) for the UPF to perform the detection and forwarding operations on frames over the N6 interface.

On the N6 interface, for inbound traffic, the "N6 Ethernet PDU session" is introduced to filter out 5GLAN Ethernet traffic from other traffic.

Figure 3:
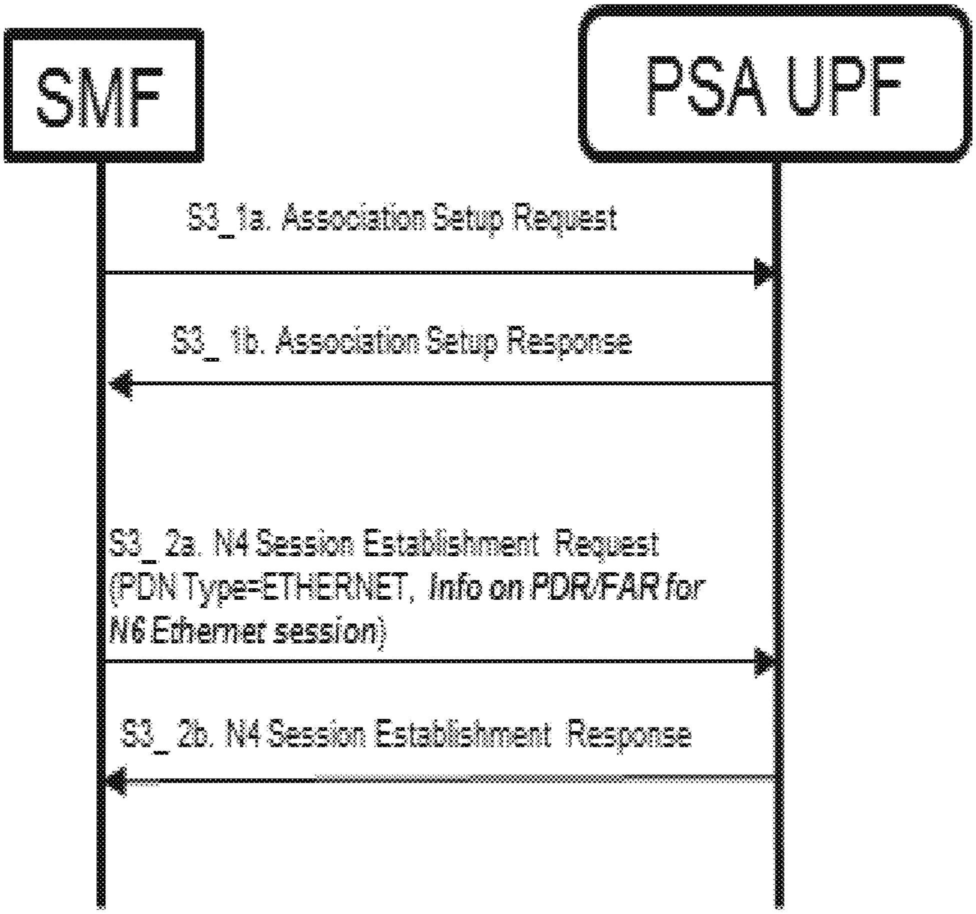
FIG. 3 schematically shows an exemplary N6 Ethernet PDU Session establishment sequence flow according to an exemplary embodiment of the present disclosure.

In an exemplary embodiment, the "N6 Ethernet PDU session" may be established by the SMF via an "N4 Session Establishment" procedure as shown in FIG. 3. The N6 ETHERNET PDU session establishment is an NF level procedure.

In this case, the SMF may perform an association setup procedure (in S3_1*a* and S3_1*b*) with the UPF, i.e., is associated with the UPF, and transmit (in S3_2*a*) an indication of establishing an N6 Ethernet PDU session to the UPF. Accordingly, the UPF may receive (in S3_2*a*) the indication of establishing the N6 Ethernet PDU session from the SMF. The indication of establishing the N6 Ethernet PDU session may be received from the SMF via the N4 Session Setup procedure.

The indication of establishing the N6 Ethernet PDU session may include an indication of a PDN type being Ethernet, and the information on frame detection and forwarding rules for the N6 Ethernet PDU session.

For example, the SMF may set the PDN Type to "Ethernet", Control Plane (CP) Fully Qualified Session ID (F-Session ID) together with PDR/FAR rules for setting up the N6 ETHERNET session in the indication of establishing the N6 Ethernet PDU session.

It should be understood that although not shown, the "N3/N19 Ethernet PDU session" may also be established by the SMF via an "N4 Session Establishment" procedure as shown in FIG. 3, which has been specified in the current 3GPP specifications.

In an exemplary embodiment, the information on frame detection and forwarding rules obtained by the UPF may be contents of at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

Alternatively, the information on frame detection and forwarding rules obtained by the UPF may be a pre-configured rule name (i.e., an indication) referring to the frame detection and forwarding rules that are pre-configured in the UPF.

In another exemplary embodiment of establishing the N6 Ethernet PDU session, the N6 Ethernet PDU session may be established by the UPF based on local pre-configuration, i.e., logic/rules for setting up the N6 Ethernet PDU session may be locally configured in the UPF. In this case, the frame detection and forwarding rules for the N6 Ethernet PDU session may be pre-configured in the UPF. That is, the N6 ETHERNET PDU session may be established by the UPF (e.g., PSA UPF) (locally preconfigured) itself without SMF involvement, if no other N4 rules to be installed with the N6 Ethernet PDU session by the SMF.

In the case of the N6 Ethernet PDU session establishment, the detection (e.g., PDR) rules of the N6 Ethernet PDU session may contain detection instructions to identify the N6 inbound 5GLAN Ethernet traffic by checking the VLAN field of the inbound frames, wherein the VLAN tags that are used to detect 5GLAN Ethernet traffic may either be provisioned by the SMF or pre-configured on the UPF. Then, the linked forwarding (e.g., FAR) rule of the N6 Ethernet PDU session instructs the UPF to direct the 5GLAN Ethernet traffic to the Ethernet Bridging function. For outbound traffic on the N6 interface, the Ethernet Bridging function will pick the "N6 Ethernet PDU session" when the N6 interface is determined as the outbound interface for the 5GLAN Ethernet traffic from the N3 or N19 interface.

In addition, for inbound N6 traffic, the PDR rules of the N6 Ethernet PDU session contains detection rules to identify the N6 inbound 5GLAN Ethernet traffic. On the N6 interface, both inbound IP traffic and native Ethernet traffic are received in the format of Ethernet frames, as IP is over Ethernet. Therefore, in order to separate L2 traffics intent to Ethernet PDU session, the VLAN field of the inbound frames needs to be checked.

- Option 1: based on VLAN tags used for 5GLAN Ethernet traffic, and/or untagged Ethernet frame (if presence). The VLAN tags that are used to detect 5GLAN Ethernet traffic are either provisioned by SMF or pre-configured in UPF
- Option 2: (alternative to Option 1), detects N6 IP (Layer 3) traffic, then the rest of N6 traffic (excluding IP traffic) can be identified as Layer 2 traffic. The N6 IP traffic can be also identified by checking the VLAN tag of its inbound Ethernet encapsulation, because the IP traffic can be also carried by Layer 2 Ethernet transport. In such case, by detecting certain VLANs used by Ethernet transport network, the IP traffic can be identified.

The SMF provides such PDR/FAR rules to the UPF together with a CP F-SEID for the N6 ETHERNET PDU session.

Hereinafter, an exemplary PDR/FAR structure for the N6 Ethernet PDU session will be described in conjunction with FIG. 4, which illustrates how traffic (tagged and untagged frames) is detected and forwarded at the N6 interface according to the exemplary PDR/FAR structure for the N6 Ethernet PDU session.

Figure 4:
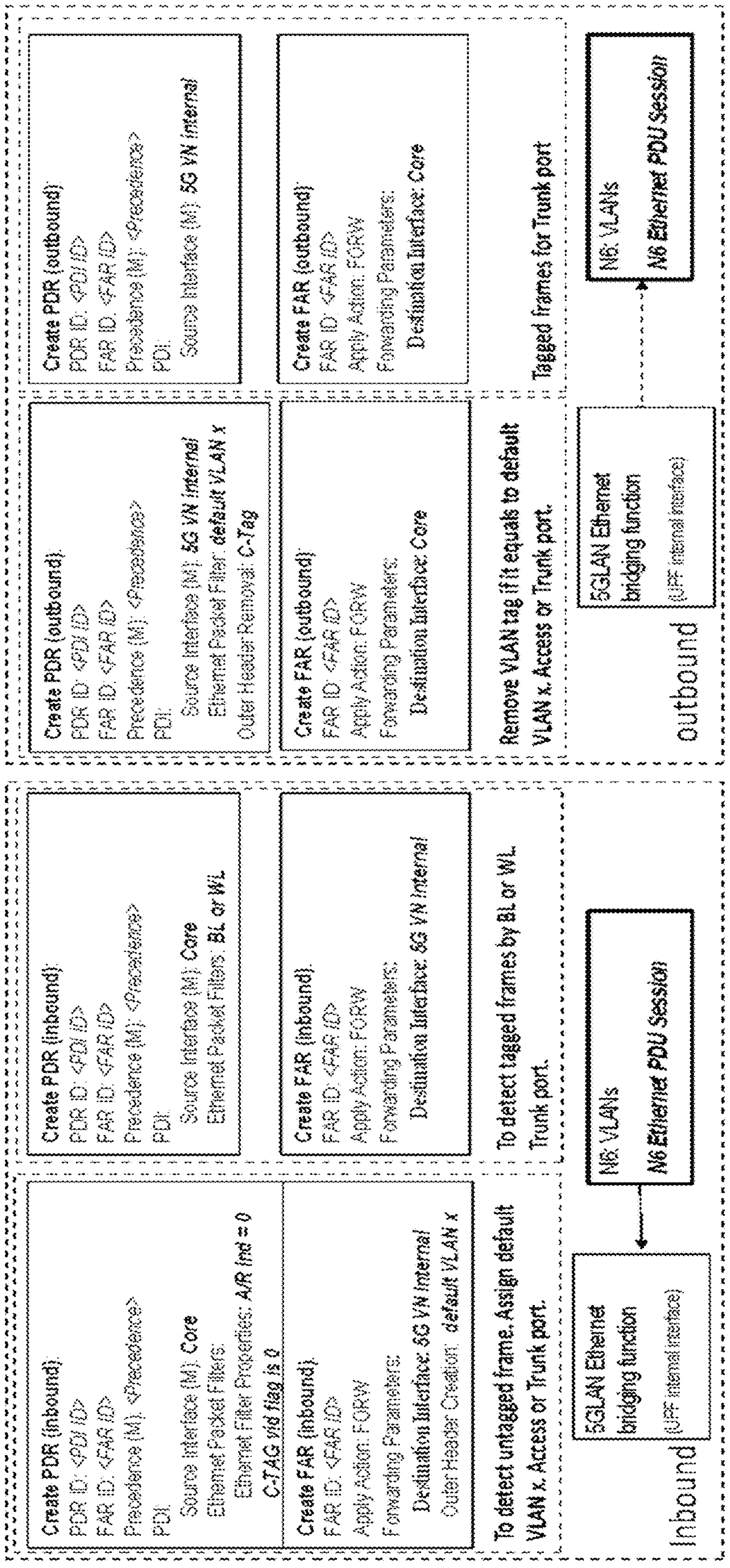
FIG. 4 schematically shows an exemplary PDR/FAR structure for an N6 Ethernet PDU session, which illustrates how traffic (tagged and untagged frames) is detected and forwarded at an N6 interface.

FIG. 4 shows structures of two exemplary pairs of PDRs/FARs for the N6 Ethernet PDU session. Although the two exemplary pairs of PDRs/FARs are shown and described herein, it should be understood that the UPF may obtain either the pair of first inbound PDR and FAR (shown in 4_IN1) and first outbound PDR and FAR (shown in 4_OUT1), or the pair of second inbound PDR and FAR (shown in 4_IN2) and second outbound PDR and FAR (shown in 4_OUT2), or both.

As shown in FIG. 4, it is specified that

For the pair of first inbound PDR and FAR (shown in 4_IN1) and first outbound PDR and FAR (shown in 4_OUT1),

- The first inbound PDR (upper of 4_IN1) is a rule of detecting and accepting an untagged frame, i.e., a frame with no VLAN ID. In an exemplary implementation, the first inbound PDR may be indicated by an Ethernet Packet Filter IE and a Source Interface IE. The Ethernet Packet Filter IE includes a C-TAG IE as shown in FIG. 8, with the VID flag set to 0 indicating no VLAN ID, and also includes an Ethernet Filter Properties IE with a newly introduced indicator ("A/R Ind" in this example), as shown in FIG. 9, set to 0 indicating "Accept". The Source Interface IE indicates a source interface from which the frame is received, which is set to "Core" for the N6 Ethernet PDU Session (the "Core" interface is defined in 3GPP TS 29.244 V17.2.0);
- The first inbound FAR (lower of 4_IN1) is a rule of assigning a default VLAN ID to the received frame with no VLAN ID and forwarding the frame assigned with the default VLAN ID to the UPF Internal interface ("5G VN Internal" in this example) that is interfaced to the Ethernet bridging function. In an exemplary implementation, the first inbound FAR may be indicated by a Destination Interface IE and an Outer Header Creation IE, wherein the Outer Header Creation IE indicates the default VLAN ID for assigning to the received frame with no VLAN ID, and the Destination Interface IE indicates the UPF internal interface to which the accepted frame is to be forwarded. That is, when the frame with no VLAN ID is detected, a default VLAN ID (e.g. VLAN ID #1) may be assigned to the frame by e.g. the Outer Header Creation. The action of FAR is forwarding, and the destination interface is the UPF internal interface such as 5G VN internal;
- The first outbound PDR (upper of 4_OUT1) is a rule of detecting the frame with a VLAN ID (e.g., the default VLAN ID) received from the internal interface and removing the VLAN ID (e.g., the default VLAN ID) from the frame. In an exemplary implementation, the first inbound PDR may be indicated by an Ethernet Packet Filter IE, a Source Interface IE, and an Outer Header Removal IE. The Ethernet Packet Filter IE indicates the default VLAN ID, the Source Interface IE indicates the UPF internal interface ("5G VN Internal" in this example) from which the frame is received, and the Outer Header Removal IE set to "C-TAG" indicates that the C-TAG needs to be removed at egress;
- The first outbound FAR (lower of 4_OUT1) is a rule of forwarding the detected frame to a destination interface. In an exemplary implementation, the first inbound FAR may be indicated by a Destination Interface IE, wherein the Destination Interface IE indicates the destination interface to which the detected frame is to be forwarded, which is set to "Core" for the N6 Ethernet PDU Session.

For the pair of second inbound PDR and FAR (shown in 4_IN2) and second outbound PDR and FAR (shown in 4_OUT2), The second inbound PDR (upper of 4_IN2) is a rule of detecting whether a received frame with a VLAN ID is accepted or rejected.

In an exemplary implementation, the second inbound PDR may be indicated by a Source Interface IE and a list of Ethernet Packet Filter IEs. The Source Interface IE indicates a source interface from which the frame is received, which is set to "Core" for the N6 Ethernet PDU Session. Each of the Ethernet Packet Filter IEs indicates a VLAN ID to be rejected (set to 1 in this example) accepted (set to 0 in this example). For example, a list of Ethernet Packet Filter IEs may be used to indicate a VLAN Blacklist or Whitelist that can be used to either reject or accept frames. It is necessary, as N6 is a Trunk port. The way of composing the Blacklist or Whitelist has been described previously, and the description thereof will thus be omitted here for simplicity;

In another exemplary implementation, the second inbound PDR may follow negotiation based on MVRP, and may be indicated by a Source Interface IE and an Ethernet Packet Filter IE. The Source Interface IE indicates a source interface from which the frame is received, which is set to "Core" for the N6 Ethernet PDU Session. The Ethernet Packet Filter IE includes an Ethernet Filter Properties IE with an indicator set to 1 to indicate "Reject" and a C-TAG IE is not present;

The second inbound FAR (lower of 4_IN2) is a rule of forwarding the accepted frame to the internal interface. In an exemplary implementation, the second inbound FAR may be indicated by a Destination Interface IE, wherein the Destination Interface IE indicates the UPF internal interface ("5G VN Internal" in this example) to which the accepted frame is to be forwarded;

The second outbound PDR (upper of 4_OUT2) is a rule of detecting the frame with the VLAN ID received from the internal interface. In an exemplary implementation, the second outbound PDR may be indicated by a Source Interface IE indicates the UPF internal interface ("5G VN Internal" in this example) from which the frame is received. The second outbound PDR may detect frames with VLAN IDs to be kept at egress. It is necessary, as N6 is a Trunk port. As the first outbound PDR has filtered out the frames with the default VLAN ID, the rest frames (with VLAN ID other than the default VLAN ID) will follow the second outbound PDR;

As an alternative, the second outbound PDR may contain a VLAN list with an Accept/Reject indicator (e.g. Whitelist or Blacklist).

The second outbound FAR (lower of 4_OUT2) is a rule of forwarding the detected frame with the VLAN ID to a destination interface. In an exemplary implementation, the second outbound FAR may be indicated by a Destination Interface IE. The Destination Interface IE indicates the destination interface to which the detected frame with the VLAN ID is to be forwarded, which is set to "Core" for the N6 Ethernet PDU Session.

As previously discussed, the current 3GPP specifications have specified the establishment procedure of the N3 Ethernet PDU Session on the N3 interface via an N4 Session Setup procedure, which may also refer to FIG. 3 except that "N6" in FIG. 3 is replaced with "N3". In particular, the SMF may transmit an indication of establishing an N3 Ethernet PDU session to the UPF. Accordingly, the UPF may receive the indication of establishing the N3 Ethernet PDU session from the SMF. The indication of establishing the N3 Ethernet PDU session may include an indication of a PDN type being Ethernet, and the information on frame detection and forwarding rules for the N3 Ethernet PDU session.

For example, the SMF may set the PDN Type to "Ethernet", Control Plane (CP) F-SEID (F-Session ID) together with PDR/FAR rules for setting up the N3 ETHERNET session in the indication of establishing the N3 Ethernet PDU session.

In an exemplary embodiment, the information on frame detection and forwarding rules obtained by the UPF may be contents of at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

In the case of the N3 Ethernet PDU session establishment, the detection (e.g., PDR) rules of the N3 Ethernet PDU session may contain detection instructions to identify the N3 inbound 5GLAN Ethernet traffic by checking the GTP Tunnel Endpoint Identifier (TEID) of the inbound frames, wherein the GTP TEID that is used to detect 5GLAN Ethernet traffic may be provisioned by the SMF. The GTP header is removed according to the Outer Header Removal defined in the PDR of the N3 Ethernet PDU session. Then, the linked forwarding (e.g., FAR) rule of the N3 Ethernet PDU session instructs the UPF to direct the 5GLAN Ethernet traffic to the Ethernet Bridging function. For outbound traffic on the N3 interface, the Ethernet Bridging function will pick the "N3 Ethernet PDU session" when the N3 interface is determined as the outbound interface.

Hereinafter, an exemplary PDR/FAR structure for the N3 Ethernet PDU session will be described in conjunction with FIG. 5, which illustrates how traffic (tagged and untagged frames) is detected and forwarded at the N6 interface according to the exemplary PDR/FAR structure for the N3 Ethernet PDU session.

Figure 5:
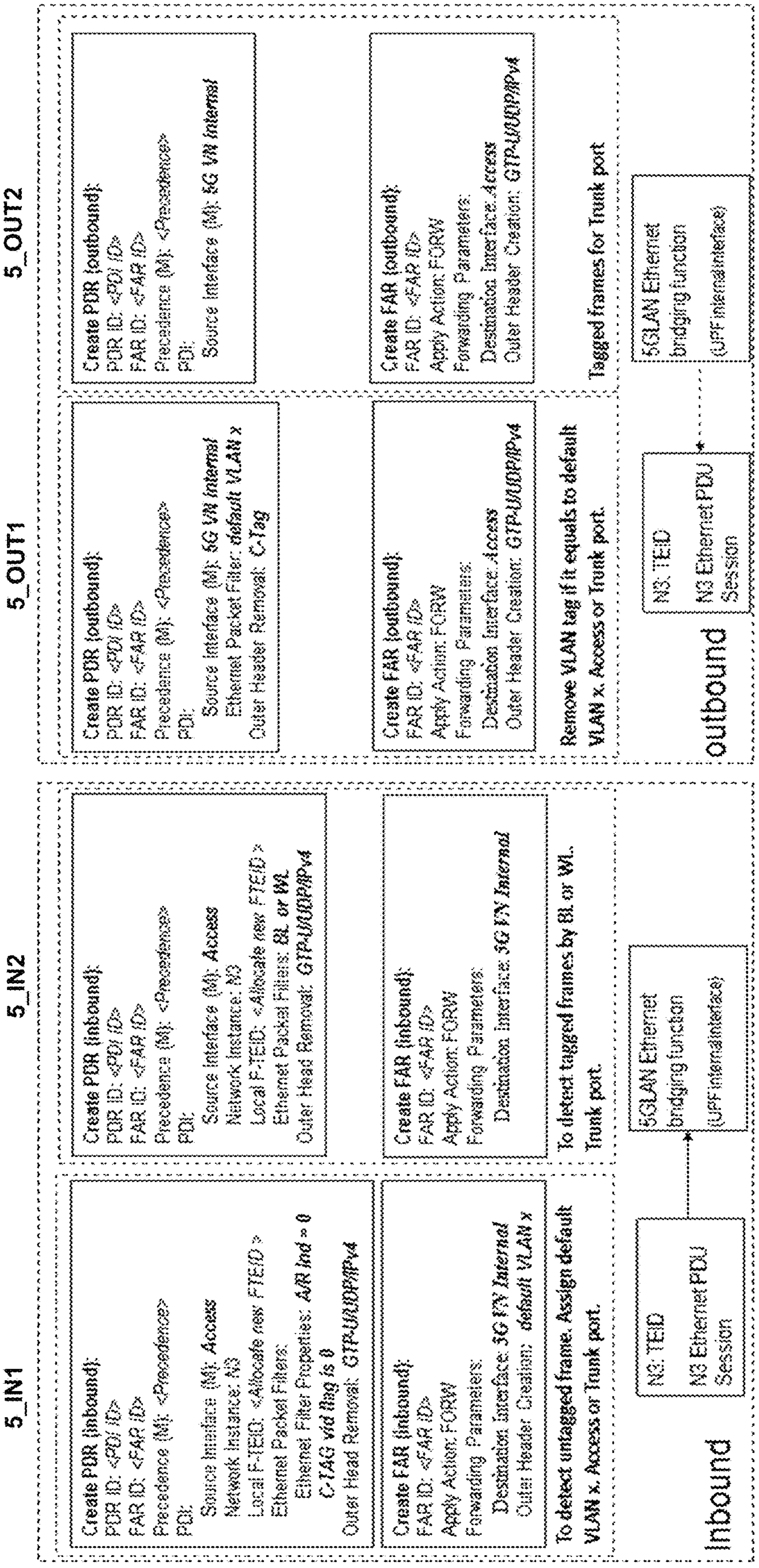
FIG. 5 schematically shows an exemplary PDR/FAR structure for an N3 Ethernet PDU session, which illustrates how traffic (tagged and untagged frames) is detected and forwarded at an N3 interface.

FIG. 5 shows structures of two exemplary pairs of PDRs/FARs for the N3 Ethernet PDU session. Although the two exemplary pairs of PDRs/FARs are shown and described herein, it should be understood that the UPF may obtain either the pair of first inbound PDR and FAR (shown in 5_IN1) and first outbound PDR and FAR (shown in 5_OUT1), or the pair of second inbound PDR and FAR (shown in 5_IN2) and second outbound PDR and FAR (shown in 5_OUT2), or both.

As shown in FIG. 5, it is specified that

For the pair of first inbound PDR and FAR (shown in 5_IN1) and first outbound PDR and FAR (shown in 5_OUT1), The first inbound PDR (upper of 5_IN1) is a rule of detecting and accepting an untagged frame, i.e., a frame with no VLAN ID, after a GTP header is removed. In an exemplary implementation, the first inbound PDR may be indicated by an Ethernet Packet Filter IE, a Source Interface IE, and an Outer Header Removal IE. The Ethernet Packet Filter IE includes a C-TAG IE as shown in FIG. 8, with the VID flag set to 0 indicating no VLAN ID, and also includes an Ethernet Filter Properties IE with a newly introduced indicator ("A/R Ind" in this example), as shown in FIG. 9, set to 0 indicating "Accept". The Source Interface IE indicates a source interface from which the frame is received, which is set to "Access" for the N3 Ethernet PDU Session. The Outer Header Removal IE set to "GTP-U/UDP/IPv4" indicates to remove a GTP header from the received frame before the received frame is detected. In addition, a Network Instance is set to "N3", and F-TEID is used for session binding. For example, the inbound traffic at N3 first needs to remove the GTP header, which can be done by setting "Out Header Removal" in the PDR. Then, the inbound traffic is detected by the "Ethernet Filter Properties", where the values: "A/R indicator=0", and "C-TAG vid flag=0" show that the untagged Ethernet frame is accepted;

The first inbound FAR (lower of 5_IN1) is a rule of assigning a default VLAN ID to the received frame with no VLAN ID after a GTP header is removed and forwarding the frame assigned with the default VLAN ID to the UPF Internal interface ("5G VN Internal" in this example) that is interfaced to the Ethernet bridging function. In an exemplary implementation, the first inbound FAR may be indicated by a Destination Interface IE and an Outer Header Creation IE, wherein the Outer Header Creation IE indicates the default VLAN ID for assigning to the received frame with no VLAN ID, and the Destination Interface IE indicates the UPF internal interface to which the accepted frame is to be forwarded. That is, when the frame with no VLAN ID is detected, a default VLAN ID (e.g. VLAN ID #1) may be assigned to the frame by e.g. the Outer Header Creation. The action of FAR is forwarding, and the destination interface is the UPF internal interface such as 5G VN internal;

The first outbound PDR (upper of 5_OUT1) is a rule of detecting the frame with a VLAN ID (e.g., the default VLAN ID) received from the internal interface and removing the VLAN ID (e.g., the default VLAN ID) from the frame. In an exemplary implementation, the first inbound PDR may be indicated by an Ethernet Packet Filter IE, a Source Interface IE, and an Outer Header Removal IE. The Ethernet Packet Filter IE indicates the default VLAN ID, the Source Interface IE indicates the UPF internal interface ("5G VN Internal" in this example) from which the frame is received, and the Outer Header Removal IE set to "C-TAG" indicates that the C-TAG needs to be removed at egress.

The first outbound FAR (lower of 5_OUT1) is a rule of forwarding the detected frame to a destination interface. In an exemplary implementation, the first inbound FAR may be indicated by a Destination Interface IE and an Outer Header Creation IE. The Destination Interface IE indicates the destination interface to which the detected frame is to be forwarded, which is set to "Access" for the N3 Ethernet PDU Session. The Outer Header Creation IE set to "GTP-U/UDP/IPv4" indicates to add a GTP (User Plane part of GTP, GTP-U) header to the detected frame before the detected frame is forwarded.

For the pair of second inbound PDR and FAR (shown in 5_IN2) and second outbound PDR and FAR (shown in 5_OUT2), The second inbound PDR (upper of 5_IN2) is a rule of detecting whether a received frame with a VLAN ID, after a GTP header is removed, is accepted or rejected;

In an exemplary implementation, the second inbound PDR may be indicated by a Source Interface IE, a list of Ethernet Packet Filter IEs, and an Outer Header Removal IE. The Source Interface IE indicates a source interface from which the frame is received, which is set to "Access" for the N3 Ethernet PDU Session. Each of the Ethernet Packet Filter IEs indicates a VLAN ID to be rejected (set to 1 in this example) accepted (set to 0 in this example). For example, a list of Ethernet Packet Filter IEs may be used to indicate a VLAN Blacklist or Whitelist that can be used to either reject or accept frames. It is necessary, as N3 is a Trunk port. The way of composing the Blacklist or Whitelist has been described previously, and the description thereof will thus be omitted here for simplicity. The Outer Header Removal IE set to "GTP-U/UDP/IPv4" indicates to remove a GTP header from the received frame before the received frame is detected. In addition, a Network Instance is set to "N3", and F-TEID is used for session binding;

In an exemplary implementation, the second inbound PDR may follow negotiation based on MVRP, and may be indicated by a Source Interface IE, an Ethernet Packet Filter IE, and an Outer Header Removal IE. The Source Interface IE indicates a source interface from which the frame is received, which is set to "Access" for the N3 Ethernet PDU Session. The Ethernet Packet Filter IE includes an Ethernet Filter Properties IE with an indicator set to 1 to indicate "Reject" and a C-TAG IE is not present. The Outer Header Removal IE set to "GTP-U/UDP/IPv4" indicates to remove a GTP header from the received frame before the received frame is detected. In addition, a Network Instance is set to "N19", and F-TEID is used for session binding;

The second inbound FAR (lower of 5_IN2) is a rule of forwarding the accepted frame to the internal interface. In an exemplary implementation, the second inbound FAR may be indicated by a Destination Interface IE, wherein the Destination Interface IE indicates the UPF internal interface ("5G VN Internal" in this example) to which the accepted frame is to be forwarded;

The second outbound PDR (upper of 5_OUT2) is a rule of detecting the frame with the VLAN ID received from the internal interface. In an exemplary implementation, the second outbound PDR may be indicated by a Source Interface IE indicates the UPF internal interface ("5G VN Internal" in this example) from which the frame is received. The second outbound PDR may detect frames with VLAN IDs to be kept at egress. It is necessary, as N3 is a Trunk port;

The second outbound FAR (lower of 5_OUT2) is a rule of forwarding the detected frame with the VLAN ID to a destination interface. In an exemplary implementation, the second outbound FAR may be indicated by a Destination Interface IE and an Outer Header Creation IE. The Destination Interface IE indicates the destination interface to which the detected frame with the VLAN ID is to be forwarded, which is set to "Access" for the N3 Ethernet PDU Session. The Outer Header Creation IE set to "GTP-U/UDP/IPv4" indicates to add a GTP header to the detected frame before the detected frame is forwarded.

As previously discussed, the current 3GPP specifications have specified the establishment procedure of the N19 Ethernet PDU Session on the N19 interface via an N4 Session Setup procedure per VN Group Granularity. In the establishment procedure of the N19 Ethernet PDU Session on the N19 interface, the indication of establishing the N19 Ethernet PDU session may include an indication of a PDN type being Ethernet, and the information on frame detection and forwarding rules for the N19 Ethernet PDU session.

As previously discussed, the conventional N19 Ethernet PDU session is per VN Group Granularity. Its establishment/releasing is upon PDU session establishment/releasing for the UEs across UPFs (e.g., PSAs) for the same VN Group.

As an enhancement on the N19 Ethernet PDU session, in an exemplary embodiment of the present disclosure, for Ethernet traffic, the N19 tunnel may act as a VLAN Trunk between two UPFs (e.g., PSAs) transmitting traffic for more than one VLAN (more than one 5G VN Group). In this case, the N19 tunnel may be per Data Network Name (DNN) granularity. Its establishment/releasing is an NF level procedure. This is less complex than a session level procedure in the convention technical solutions.

Hereinafter, an exemplary N19 Ethernet PDU Session establishment sequence flow according to an exemplary embodiment of the present disclosure will be described in conjunction with FIG. 6.

The SMF is in charge of the establishment of Ethernet N19 PDU session between each pair of UPFs (e.g., PSAs) which support the same DNN.

Figure 6:
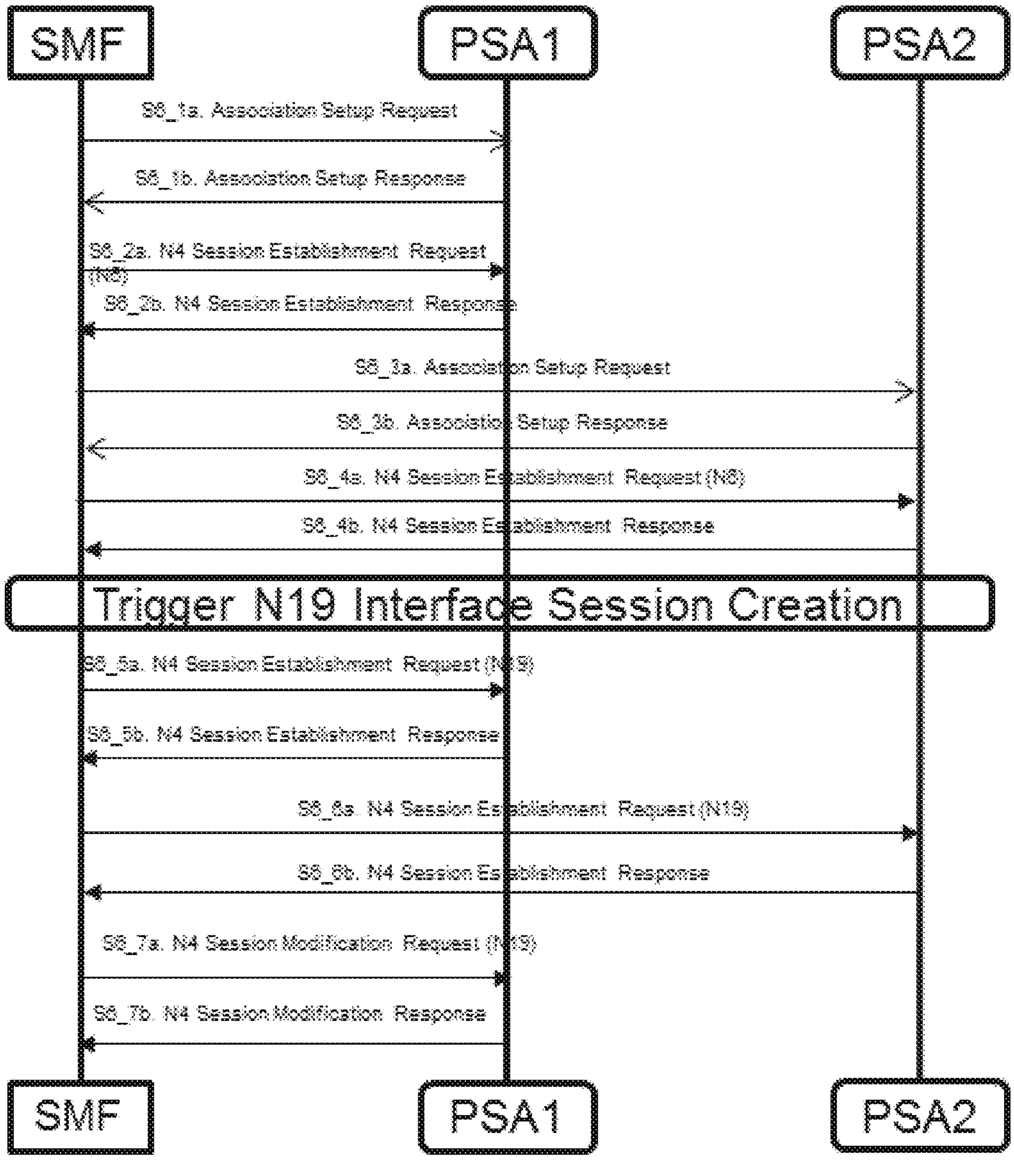
FIG. 6 schematically shows an exemplary N19 Ethernet PDU Session establishment sequence flow according to an exemplary embodiment of the present disclosure.

It is assumed that the SMF may also in charge of the N6 ETHERNET session establishment, as in the sequence flow shown in FIG. 6 in S6_1*a*~S6_2*b* for UPF1 ("PSA1" shown in FIG. 6) and S6_3*a*~S6_4*b* for UPF2 ("PSA2" shown in FIG. 6), which are respectively similar with the process as shown in FIG. 3. It should be understood that the N6 ETHERNET session establishment may also be respectively established by the UPF1 and the UPF2, although not shown.

As shown in FIG. 6, in S6_1*a* and S6_1*b*, a Packet Forwarding Control Protocol (PFCP) Association Setup procedure is performed between the SMF and the PSA1 (as described in Clauses 4.4.3.1 (N4 association setup) and 5.8 (502) of 3GPP TS 23.501, V17.2.0);

- in S6_2*a* and S6_2*b*, an N6 ETHERNET PDU Session establishment is performed for DNN-X, for the PSA1;
- in S6_3*a* and S6_3*b*, a PFCP Association Setup procedure is performed between the SMF and the PSA2 (as described in Clauses 4.4.3.1 (N4 association setup) and 5.8 (502) of 3GPP TS 23.501, V17.2.0);
- in S6_4*a* and S6_4*b*, an N6 ETHERNET PDU Session establishment is performed for DNN-X, for the PSA2;

Once the SMF completes the PFCP Association Setup procedure with the pair of PSA UPFs (PSA1 and PSA2 in this example) respectively, e.g., at S6_4*a* or S6_4*b*, i.e., the SMF is respectively associated with the PSA1 and PSA2 in the pair, the SMF may transmit, to the PSA1 and PSA2 respectively, an indication of establishing the N19 Ethernet PDU session per pair for transmitting multiple VLANs in one N19 Ethernet PDU session.

That is, the SMF triggers an N19 Ethernet PDU Session Establishment for the pair of PSA1 and PSA1 via an N4 Session Setup procedure.

- in S6_5*a* and S6_5*b*, the SMF establishes an N19 Ethernet PDU Session towards the PSA1, and requests the PSA1 to allocate an N19 F-TEID;
- in S6_6*a* and S6_6*b*, the SMF establishes an N19 Ethernet PDU Session towards the PSA2, and requests the PSA2 to allocate an N19 F-TEID, also update the PSA1's N19 tunnel information in FAR;
- in S7_6*a* and S7_6*b*, the SMF performs an N4 Session Modification procedure with the PSA1 to update the PSA2's N19 tunnel information in FAR.

In an exemplary embodiment, the information on frame detection and forwarding rules obtained by the UPF may be contents of at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

Alternatively, the information on frame detection and forwarding rules obtained by the UPF may be a pre-configured rule name (i.e., an indication) referring to the frame detection and forwarding rules that are pre-configured in the UPF.

In the case of the N19 Ethernet PDU session establishment, the detection (e.g., PDR) rules of the N19 Ethernet PDU session may contain detection instructions to identify the N19 inbound 5GLAN Ethernet traffic by checking the GTP Tunnel Endpoint Identifier (TEID) of the inbound frames, wherein the GTP TEID that is used to detect 5GLAN Ethernet traffic may be provisioned by the SMF. The GTP header is removed according to the Outer Header Removal defined in the PDR of the N19 Ethernet PDU session. Then, the linked forwarding (e.g., FAR) rule of the N19 Ethernet PDU session instructs the UPF to direct the 5GLAN Ethernet traffic to the Ethernet Bridging function. For outbound traffic on the N19 interface, the Ethernet Bridging function will pick the "N19 Ethernet PDU session" when the N19 interface is determined as the outbound interface for the 5GLAN Ethernet traffic from the N6 or N3 interface.

Hereinafter, an exemplary PDR/FAR structure for the N3 Ethernet PDU session will be described in conjunction with FIG. 7, which illustrates how traffic (tagged and untagged frames) is detected and forwarded at the N19 interface according to the exemplary PDR/FAR structure for the N19 Ethernet PDU session.

Figure 7:
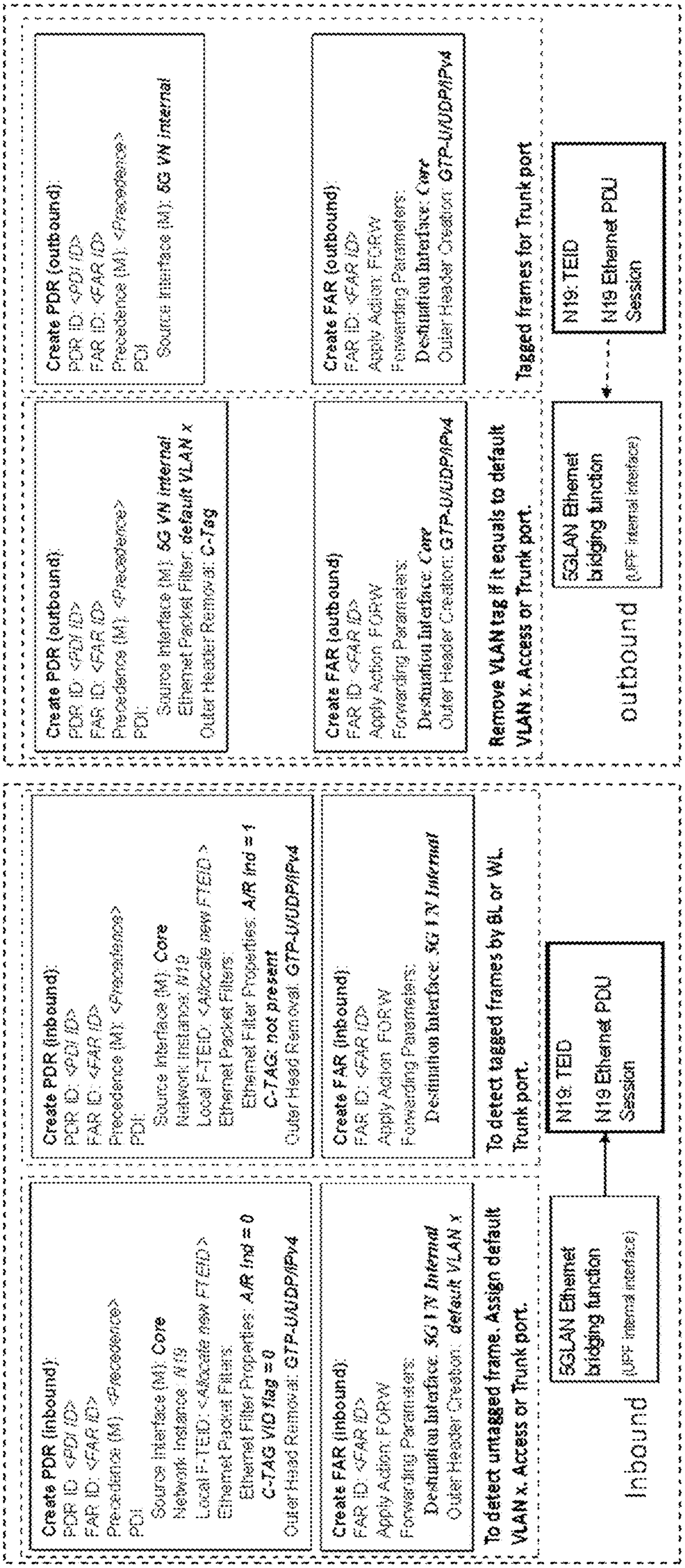
FIG. 7 schematically shows an exemplary PDR/FAR structure for an N19 Ethernet PDU session, which illustrates how traffic (tagged and untagged frames) is detected and forwarded at an N19 interface.

FIG. 7 shows structures of two exemplary pairs of PDRs/FARs for the N19 Ethernet PDU session. Although the two exemplary pairs of PDRs/FARs are shown and described herein, it should be understood that the UPF may obtain either the pair of first inbound PDR and FAR (shown in 7_IN1) and first outbound PDR and FAR (shown in 7_OUT1), or the pair of second inbound PDR and FAR (shown in 7_IN2) and second outbound PDR and FAR (shown in 7_OUT2), or both.

As shown in FIG. 7, it is specified that

For the pair of first inbound PDR and FAR (shown in 7_IN1) and first outbound PDR and FAR (shown in 7_OUT1),

- The first inbound PDR (upper of 7_IN1) is a rule of detecting and accepting an untagged frame, i.e., a frame with no VLAN ID, after a GTP header is removed. In an exemplary implementation, the first inbound PDR may be indicated by an Ethernet Packet Filter IE, a Source Interface IE, and an Outer Header Removal IE. The Ethernet Packet Filter IE includes a C-TAG IE as shown in FIG. 8, with the VID flag set to 0 indicating no VLAN ID, and also includes an Ethernet Filter Properties IE with a newly introduced indicator ("A/R Ind" in this example), as shown in FIG. 9, set to 0 indicating "Accept". The Source Interface IE indicates a source interface from which the frame is received, which is set to "Core" for the N19 Ethernet PDU Session. The Outer Header Removal IE set to "GTP-U/UDP/IPv4" indicates to remove a GTP header from the received frame before the received frame is detected. In addition, a Network Instance is set to "N19", and F-TEID is used for session binding. For example, the inbound traffic at N19 first needs to remove the GTP header, which can be done by setting "Out Header Removal" in the PDR. Then, the inbound traffic is detected by the "Ethernet Filter Properties", where the values: "A/R indicator=0", and "C-TAG vid flag=0" show that the untagged Ethernet frame is accepted;

The first inbound FAR (lower of 7_IN1) is a rule of assigning a default VLAN ID to the received frame with no VLAN ID after a GTP header is removed and forwarding the frame assigned with the default VLAN ID to the UPF Internal interface ("5G VN Internal" in this example) that is interfaced to the Ethernet bridging function. In an exemplary implementation, the first inbound FAR may be indicated by a Destination Interface IE and an Outer Header Creation IE, wherein the Outer Header Creation IE indicates the default VLAN ID for assigning to the received frame with no VLAN ID, and the Destination Interface IE indicates the UPF internal interface to which the accepted frame is to be forwarded. That is, when the frame with no VLAN ID is detected, a default VLAN ID (e.g. VLAN ID #1) may be assigned to the frame by e.g. the Outer Header Creation. The action of FAR is forwarding, and the destination interface is the UPF internal interface such as 5G VN internal;

The first outbound PDR (upper of 7_OUT1) is a rule of detecting the frame with a VLAN ID (e.g., the default VLAN ID) received from the internal interface and removing the VLAN ID (e.g., the default VLAN ID) from the frame. In an exemplary implementation, the first inbound PDR may be indicated by an Ethernet Packet Filter IE, a Source Interface IE, and an Outer Header Removal IE. The Ethernet Packet Filter IE indicates the default VLAN ID, the Source Interface IE indicates the UPF internal interface ("5G VN Internal" in this example) from which the frame is received, and the Outer Header Removal IE set to "C-TAG" indicates that the C-TAG needs to be removed at egress.

The first outbound FAR (lower of 7_OUT1) is a rule of forwarding the detected frame to a destination interface. In an exemplary implementation, the first inbound FAR may be indicated by a Destination Interface IE and an Outer Header Creation IE. The Destination Interface IE indicates the destination interface to which the detected frame is to be forwarded, which is set to "Core" for the N19 Ethernet PDU Session. The Outer Header Creation IE set to "GTP-U/UDP/IPv4" indicates to add a GTP (User Plane part of GTP, GTP-U) header to the detected frame before the detected frame is forwarded.

For the pair of second inbound PDR and FAR (shown in 7_IN2) and second outbound PDR and FAR (shown in 7_OUT2), The second inbound PDR (upper of 7_IN2) is a rule of detecting whether a received frame with a VLAN ID, after a GTP header is removed, is accepted or rejected;

In an exemplary implementation, the second inbound PDR may follow negotiation based on MVRP, and may be indicated by a Source Interface IE, an Ethernet Packet Filter IE, and an Outer Header Removal IE. The Source Interface IE indicates a source interface from which the frame is received, which is set to "Core" for the N19 Ethernet PDU Session. The Ethernet Packet Filter IE includes an Ethernet Filter Properties IE with an indicator set to 1 to indicate "Reject" and a C-TAG IE is not present. The Outer Header Removal IE set to "GTP-U/UDP/IPv4" indicates to remove a GTP header from the received frame before the received frame is detected. In addition, a Network Instance is set to "N19", and F-TEID is used for session binding; In another exemplary implementation, the second inbound PDR may be indicated by a Source Interface IE, a list of Ethernet Packet Filter IEs, and an Outer Header Removal IE. The Source Interface IE indicates a source interface from which the frame is received, which is set to "Core" for the N19 Ethernet PDU Session. Each of the Ethernet Packet Filter IEs indicates a VLAN ID to be rejected (set to 1 in this example) accepted (set to 0 in this example). For example, a list of Ethernet Packet Filter IEs may be used to indicate a VLAN Blacklist or Whitelist that can be used to either reject or accept frames. It is necessary, as N19 is a Trunk port. The way of composing the Blacklist or Whitelist has been described previously, and the description thereof will thus be omitted here for simplicity. The Outer Header Removal IE set to "GTP-U/UDP/IPv4" indicates to remove a GTP header from the received frame before the received frame is detected. In addition, a Network Instance is set to "N19", and F-TEID is used for session binding;

The second inbound FAR (lower of 7_IN2) is a rule of forwarding the accepted frame to the internal interface. In an exemplary implementation, the second inbound FAR may be indicated by a Destination Interface IE, wherein the Destination Interface IE indicates the UPF internal interface ("5G VN Internal" in this example) to which the accepted frame is to be forwarded;

The second outbound PDR (upper of 7_OUT2) is a rule of detecting the frame with the VLAN ID received from the internal interface. In an exemplary implementation, the second outbound PDR may be indicated by a Source Interface IE indicates the UPF internal interface ("5G VN Internal" in this example) from which the frame is received. The second outbound PDR may detect frames with VLAN IDs to be kept at egress. It is necessary, as N19 is a Trunk port;

The second outbound FAR (lower of 7_OUT2) is a rule of forwarding the detected frame with the VLAN ID to a destination interface. In an exemplary implementation, the second outbound FAR may be indicated by a Destination Interface IE and an Outer Header Creation IE. The Destination Interface IE indicates the destination interface to which the detected frame with the VLAN ID is to be forwarded, which is set to "Core" for the N19 Ethernet PDU Session. The Outer Header Creation IE set to "GTP-U/UDP/IPv4" indicates to add a GTP header to the detected frame before the detected frame is forwarded.

The Ethernet Bridging function of the UPF enables the UPF to perform filtering (detection) and forwarding operations on the Ethernet traffic according to Clause 8.6 of IEEE 802.1Q-2018 based on the entries in the FDB (Clause 8.8 of IEEE 802.1Q-2018) with each port being binding to an N3 or N19 Ethernet PDU session or an newly introduced N6 Ethernet PDU session.

The Ethernet bridging function may perform at least one of:

assigning a VLAN ID to an untagged frame;

accepting or rejecting a frame by checking the source and/or destination MAC address;

accepting or rejecting a tagged frame by checking the VLAN tag (i.e., VLAN ID);

looking up the FDB with source MAC address and VLAN ID of the frame, to find a Session ID of an outbound interface.

replicating the frame and forward it to all sessions of one VLAN ID in a case where the destination MAC address is unknown or it is a multicast/broadcast address.

removing the VLAN tag (i.e., VLAN ID) from the frame on the egress when needed.

It should be noted that the Customer-TAG (C-TAG) IE as shown in FIG. 7 defined in 3GPP TS 29.244 V17.2.0 may be used for VLAN tag purpose. The "C-TAG" may be considered equivalent to "VLAN tag" or "VLAN ID" throughout the specification.

In addition, the Ethernet Bridging function shall always ensure that the packet is not forwarded to its origin. E.g., the session ID of the forwarding step must not be the same as that of the detection step.

The FDB specifics correspondence among MAC addresses, VLAN IDs, and Session IDs (i.e., Ports), and may be built the Ethernet bridging function by at least one of:

pre-configuration of the UPF;

receiving, from an SMF, the frame detection and forwarding rules with MAC address(es) and/or VLAN ID(s) for populating the FDB with the MAC address(es) and/or VLAN ID(s) via an N4 Session Setup procedure;

learning and recording MAC address(es) and/or VLAN ID(s) of received frame(s) for populating the FDB with the MAC address(es) and/or VLAN ID(s);

detecting and reporting MAC address(es) and/or VLAN ID(s) of received frame(s) to the SMF, and receiving, from the SMF, the MAC addresses and/or VLAN ID(s) for populating the FDB with the MAC address(es) and/or VLAN ID(s) via an N4 Session Modification procedure.

When the session ID is decided for the forwarding step, the UPF acts according to the outbound PDR/FAR rules of the session, and sends traffic to the outbound interface.

The UPF has the knowledge of the relationship between a UE and its PDU session(s), and the UPF also knows the "MAC addresses used by the UE" (any MAC address used by the UE or any device locally connected to the UE and using the PDU Session to communicate with the DN), and MAC addresses used by N6 and N19. The MAC addresses used by UE, N6, N19 can be part of static/dynamic filtering entry in the FDB.

The UPF bridging function, based on the destination MAC address and VLAN information of the inbound Ethernet frame, then can find which UE and its PDU session to forward the traffic, and also does tagging or untagging the VLAN operation based on the static/dynamic VLAN registration entry. In such a way, the VLAN tag add/removal operation and traffic forwarding operation do not need to be controlled or determined by SMF.

Hereinafter, a method 1000 performed by a second network node for supporting frame detection and forwarding on a user plane according to an exemplary embodiment of the present disclosure will be described with reference to FIG. 10. It should be understood that the method 1000 performed by the second network node corresponds to the method 200 performed by the first network node as previously described. Thus, some description of the method 1000 may refer to those of method 100, and thus will be omitted for simplicity.

In an exemplary embodiment, the second network node may be a SMF. It should be understood that the second network node may also be any other appropriate entity that can be configured to perform the method 1000 as described below, including a virtualized entity that may be implemented on cloud.

As shown in FIG. 10, the method 1000 may include at least steps S1001.

In step S1001, the SMF may transmit, to a first network node (e.g., an UPF) capable of an Ethernet bridging function, an indication of establishing a PDU session, which at least includes an indication of a PDN type being Ethernet, and information on frame detection and forwarding rules for the Ethernet PDU session. As previously described, the frame detection and forwarding rules may be used for the first network node to perform detection and forwarding operations on a frame.

The frame detection and forwarding rules may include at least one of:

a pair of first inbound detection and forwarding rules and first outbound detection and forwarding rules, and a pair of second inbound detection and forwarding rules and second outbound detection and forwarding rules.

The first inbound detection and forwarding rules may include:

a first inbound detection rule of detecting and accepting a received frame with no VLAN ID, and a first inbound forwarding rule of assigning a default VLAN ID to the received frame with no VLAN ID and forwarding the frame assigned with the default VLAN ID to an internal interface of the first network node that is interfaced to the Ethernet bridging function, and a first outbound detection rule of detecting the frame with the default VLAN ID received from the internal interface and removing the default VLAN ID from the frame, and a first outbound forwarding rule of forwarding the detected frame to a destination interface; and The second inbound detection and forwarding rules may include:

a second inbound detection rule of detecting whether a received frame with a VLAN ID is accepted or rejected, and a second inbound forwarding rule of forwarding the accepted frame to the internal interface, and a second outbound detection rule of detecting the frame with the VLAN ID received from the internal interface, and a second outbound forwarding rule of forwarding the detected frame with the VLAN ID to a destination interface.

In an exemplary embodiment, the first inbound detection rule may be a PDR, and may be indicated by an Ethernet Packet Filter IE and a Source Interface IE, wherein the Ethernet Packet Filter IE includes a C-TAG IE (encoded as shown in FIG. 8, which has been described previously) indicating no VLAN ID (i.e., "untagged") and an Ethernet Filter Properties IE (encoded as shown in FIG. 9, which has been described previously) with an indicator indicating "Accept", and the Source Interface IE indicates a source interface from which the frame is received.

For example, the C-TAG IE with its VID flag set to 0 may indicate no VLAN ID, and the indicator set to 0 may indicate "Accept".

The Source Interface IE may indicate a Core Interface for the N6 or N19 Ethernet PDU Session, while indicate an Access Interface for the N3 Ethernet PDU Session.

In an exemplary embodiment, the first inbound forwarding rule may be an FAR, and may be indicated by a Destination Interface IE and an Outer Header Creation IE, wherein the Outer Header Creation IE indicates the default VLAN ID for assigning to the received frame with no VLAN ID, and the Destination Interface IE indicates the internal interface to which the accepted frame is to be forwarded.

The exemplary first inbound detection rule and first inbound forwarding rule may refer to 4_IN1 in FIG. 4, 5_IN1 in FIG. 5, or 7_IN1 in FIG. 7, which has been described previously.

In an exemplary embodiment, the first outbound detection rule may be a PDR, and may be indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.

In an exemplary embodiment, the first outbound forwarding rule may be an FAR, and may be indicated by a Destination Interface IE, wherein the Destination Interface IE indicates the destination interface to which the detected frame is to be forwarded.

The exemplary first outbound detection rule and first outbound forwarding rule may refer to 4_OUT1 in FIG. 4, 5_OUT1 in FIG. 5, or 7_OUT1 in FIG. 7, which has been described previously.

In an exemplary embodiment, the second inbound detection rule may be a PDR, and may be indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.

In each Ethernet Packet Filter IE of the list, a C-TAG IE indicates a VLAN ID, and an Ethernet Filter Properties IE includes an indicator, which is set to 1 to indicate "Reject", or set to 0 to indicate "Accept". Thus, the VLAN ID indicted by the C-TAG IE with the indicator set to 1 is a member of a Blacklist (BL), or the VLAN ID indicted by the C-TAG IE with the indicator set to 0 is a member of a Whitelist (WL).

As such, all VLAN IDs with the indicator set to 1 compose the BL, or all VLAN IDs with the indicator set to 0 compose the WL.

The exemplary second inbound detection rule may refer to 4_IN2 in FIG. 4, or 5_IN2 in FIG. 5, which has been described previously. It should be understood that BL/WL may also be used for Ethernet Packet Filter IEs in 7_IN2 of FIG. 7, although not shown.

Alternatively, the second inbound detection rule may follow negotiation based on MVRP, and may be indicated by a Source Interface IE and an Ethernet Packet Filter IE, wherein the Source Interface IE indicates a source interface from which the frame is received, and the Ethernet Packet Filter IE includes an Ethernet Filter Properties IE with an indicator set to 1 to indicate "Reject" and a C-TAG IE is not present, which may refer to 7_IN2 in FIG. 7, which has been described previously. It should be understood that the Ethernet Packet Filter IE including an Ethernet Filter Properties IE with an indicator set to 1 to indicate "Reject" and a C-TAG IE not present may also be used for Ethernet Packet Filter IE in 4_IN2 in FIG. 4, or 5_IN2 in FIG. 5, although not shown.

In an exemplary embodiment, the second inbound forwarding rule may be an FAR, and may be indicated by a Destination Interface IE, wherein the Destination Interface IE indicates the internal interface to which the accepted frame is to be forwarded.

The exemplary second inbound forwarding rule may refer to 4_IN2 in FIG. 4, 5_IN2 in FIG. 5, or 7_IN2 in FIG. 7, which has been described previously.

In an exemplary embodiment, the second outbound detection rule may be a PDR, and may be indicated by a Source Interface IE indicates the internal interface from which the frame is received.

In an exemplary embodiment, the second outbound forwarding rule may be an FAR, and may be indicated by a Destination Interface IE, wherein the Destination Interface IE indicates the destination interface to which the detected frame with the VLAN ID is to be forwarded.

The exemplary second outbound detection rule and second outbound forwarding rule may refer to 4_OUT2 in FIG. 4, 5_OUT2 in FIG. 5, or 7_OUT2 in FIG. 7, which has been described previously.

As previously described, the first network node may be a UPF, and the second network node is an SMF. In this case, the internal interface may be an UPF internal interface, and the Ethernet PDU session for which the information on frame detection and forwarding rules may be obtained may include at least one of:

an N6 Ethernet PDU session between an N6 interface and the UPF internal interface, an N3 Ethernet PDU Session between an N3 interface and the UPF internal interface, and an N19 Ethernet PDU Session between an N19 interface and the UPF internal interface.

The Source Interface IE may indicate a Core Interface for the N6 or N19 Ethernet PDU Session, and indicate an Access Interface for the N3 Ethernet PDU Session.

The Destination Interface IE may indicate a Core Interface for the N6 or N19 Ethernet PDU Session, and indicates an Access Interface for the N3 Ethernet PDU Session.

The N6/N3 Ethernet PDU session may be established by the SMF via an N4 Session Setup procedure. In this case, in the transmitting step 1001, the SMF may transmit, to the UPF, an indication of establishing the N6/N3 Ethernet PDU session, which at least includes the indication of the PDN type being Ethernet, and the information on frame detection and forwarding rules.

The N19 Ethernet PDU session may be established by the SMF via an N4 Session Setup procedure, In this case, in the transmitting step 1001, the SMF may respectively transmit, to a pair of UPFs including the UPF, an indication of establishing the N19 Ethernet PDU session, which at least includes the indication of the PDN type being Ethernet, and the information on frame detection and forwarding rules.

In an exemplary embodiment, the indication of establishing the N19 Ethernet PDU session may indicate to establish the N19 Ethernet PDU session per pair of UPFs for transmitting multiple VLANs in the N19 Ethernet PDU session, and may be transmitted by the SMF once the SMF is respectively associated with the UPFs in the pair of UPFs.

The information on frame detection and forwarding rules may include at least one of:

a pre-configured rule name referring to the frame detection and forwarding rules that are pre-configured in the UPF, or the at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

As previously described, in the first inbound detection rule and the second inbound detection rule for the established N19 or N3 Ethernet PDU session, an Outer Header Removal IE set to "GTP-U/UDP/IPv4" indicates to remove a GTP header from the received frame before the received frame is detected. In the first outbound forwarding rule and the second outbound forwarding rule for the established N19 or N3 Ethernet PDU session, an Outer Header Creation IE set to "GTP-U/UDP/IPv4" indicates to add a GTP header to the detected frame before the detected frame is forwarded.

The internal interface may be a "5G VN Internal" interface.

Figure 11:
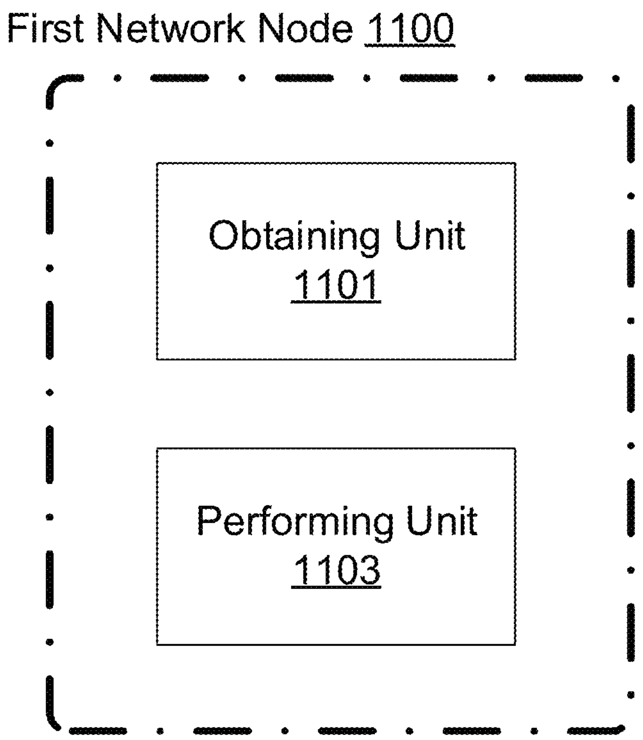
FIG. 11 schematically shows a structural block diagram of a first network node according to an exemplary embodiment of the present disclosure.

Hereinafter, a structure of a first network node according to an exemplary embodiment of the present disclosure will be described with reference to FIG. 11. FIG. 11 schematically shows a block diagram of the first network node 1100 according to an exemplary embodiment of the present disclosure. The first network node 1100 in FIG. 6 may perform the method 200 with reference to FIG. 2 and signaling sequence diagrams with reference to FIGS. 3 and 6. Accordingly, some detailed description on the first network node 1100 may refer to the corresponding description of the method 200 as shown in FIG. 2 in conjunction with the signaling sequence diagrams as shown in FIGS. 3 and 6, and thus will be omitted here for simplicity.

As shown in FIG. 11, the first network node 1100 may include at least an obtaining unit 1101 and a performing unit 1103.

The obtaining unit 1101 may be configured to obtain information on frame detection and forwarding rules for an Ethernet PDU session.

The frame detection and forwarding rules may include at least one of:

- a pair of first inbound detection and forwarding rules and first outbound detection and forwarding rules, and
- a pair of second inbound detection and forwarding rules and second outbound detection and forwarding rules.

The first inbound detection and forwarding rules may include:

- a first inbound detection rule of detecting and accepting a received frame with no VLAN ID, and a first inbound forwarding rule of assigning a default VLAN ID to the received frame with no VLAN ID and forwarding the frame assigned with the default VLAN ID to an internal interface of the first network node that is interfaced to the Ethernet bridging function, and
- a first outbound detection rule of detecting the frame with the default VLAN ID received from the internal interface and removing the default VLAN ID from the frame, and a first outbound forwarding rule of forwarding the detected frame to a destination interface; and The second inbound detection and forwarding rules may include:

- a second inbound detection rule of detecting whether a received frame with a VLAN ID is accepted or rejected, and a second inbound forwarding rule of forwarding the accepted frame to the internal interface, and
- a second outbound detection rule of detecting the frame with the VLAN ID received from the internal interface, and a second outbound forwarding rule of forwarding the detected frame with the VLAN ID to a destination interface.

The performing unit 1103 may be configured to perform detection and forwarding operations on a frame according to the frame detection and forwarding rules.

In an exemplary embodiment, the first inbound detection rule is a PDR, and is indicated by an Ethernet Packet Filter IE and a Source Interface IE, wherein the Ethernet Packet Filter IE includes a C-TAG IE indicating no VLAN ID and an Ethernet Filter Properties IE with an indicator indicating "Accept", and the Source Interface IE indicates a source interface from which the frame is received.

In an exemplary embodiment, the C-TAG IE with its VID flag set to 0 indicates no VLAN ID, and the indicator set to 0 indicates "Accept".

In an exemplary embodiment, the first inbound forwarding rule is an FAR, and is indicated by a Destination Interface IE and an Outer Header Creation IE, wherein the Outer Header Creation IE indicates the default VLAN ID for assigning to the received frame with no VLAN ID, and the Destination Interface IE indicates the internal interface to which the accepted frame is to be forwarded.

In an exemplary embodiment, the first outbound detection rule is a PDR, and is indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.

In an exemplary embodiment, the first outbound forwarding rule is an FAR, and is indicated by a Destination Interface IE, wherein the Destination Interface IE indicates the destination interface to which the detected frame is to be forwarded.

In an exemplary embodiment, the second inbound detection rule is a PDR, and is indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.

In an exemplary embodiment, in each Ethernet Packet Filter IE of the list, a C-TAG IE indicates a VLAN ID, and an Ethernet Filter Properties IE includes an indicator, which is set to 1 to indicate "Reject", or set to 0 to indicate "Accept".

In an exemplary embodiment, the second inbound detection rule follows negotiation based on MVRP, and is indicated by a Source Interface IE and an Ethernet Packet Filter IE, wherein the Source Interface IE indicates a source interface from which the frame is received, and the Ethernet Packet Filter IE includes an Ethernet Filter Properties IE with an indicator set to 1 to indicate "Reject" and a C-TAG IE is not present.

In an exemplary embodiment, the second inbound forwarding rule is an FAR, and is indicated by a Destination Interface IE, wherein the Destination Interface IE indicates the internal interface to which the accepted frame is to be forwarded.

In an exemplary embodiment, the second outbound detection rule is an PDR, and is indicated by a Source Interface IE indicates the internal interface from which the frame is received.

In an exemplary embodiment, the second outbound forwarding rule is an FAR, and is indicated by a Destination Interface IE, wherein the Destination Interface IE indicates the destination interface to which the detected frame with the VLAN ID is to be forwarded.

In an exemplary embodiment, the first network node is a UPF, wherein the internal interface is an UPF internal interface, and the Ethernet PDU session for which the information on frame detection and forwarding rules are obtained includes at least one of:

- an N6 Ethernet PDU session between an N6 interface and the UPF internal interface,
- an N3 Ethernet PDU Session between an N3 interface and the UPF internal interface, and
- an N19 Ethernet PDU Session between an N19 interface and the UPF internal interface.

In an exemplary embodiment, the Source Interface IE indicates a Core Interface for the N6 or N19 Ethernet PDU Session, and the Source Interface IE indicates an Access Interface for the N3 Ethernet PDU Session.

In an exemplary embodiment, the Destination Interface IE indicates a Core Interface for the N6 or N19 Ethernet PDU Session, and the Destination Interface IE indicates an Access Interface for the N3 Ethernet PDU Session.

In an exemplary embodiment, the N6 Ethernet PDU session is established by the UPF based on local pre-configuration, and the frame detection and forwarding rules for the N6 Ethernet PDU session are pre-configured in the UPF.

In an exemplary embodiment, the N6/N3/N19 Ethernet PDU session is established by an SMF, and the method further includes: receiving, from the SMF, an indication of establishing the N6/N3/N19 Ethernet PDU session, which at least includes an indication of a PDN type being Ethernet, and the information on frame detection and forwarding rules.

In an exemplary embodiment, the indication of establishing the N6/N3/N19 Ethernet session is received from the SMF via an N4 Session Setup procedure.

In an exemplary embodiment, the information on frame detection and forwarding rules includes at least one of:

- a pre-configured rule name referring to the frame detection and forwarding rules that are pre-configured in the UPF, or
- the at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

In an exemplary embodiment, in the first inbound detection rule and the second inbound detection rule for the established N19 or N3 Ethernet PDU session, an Outer Header Removal IE set to "GTP-U/UDP/IPv4" indicates to remove a GTP header from the received frame before the received frame is detected.

In an exemplary embodiment, in the first outbound forwarding rule and the second outbound forwarding rule for the established N19 or N3 Ethernet PDU session, an Outer Header Creation IE set to "GTP-U/UDP/IPv4" indicates to add a GTP header to the detected frame before the detected frame is forwarded.

In an exemplary embodiment, the N19 Ethernet PDU session is established by the SMF via an N4 Session Setup procedure, and the method further includes: once the SMF is respectively associated with UPFs in a pair of UPFs including the UPF, receiving, from the SMF, an indication of establishing the N19 Ethernet PDU session per pair of UPFs for transmitting multiple VLANs in the N19 Ethernet PDU session.

In an exemplary embodiment, the Ethernet bridging function is implemented based on an FDB in the UPF, and includes at least one of:

- a filtering operation function for detecting whether to accept or reject a frame,
- a VLAN operation function for assigning/removing a VLAN ID to/from a frame, and
- a forwarding operation function for forwarding L2 Ethernet traffic in a format of frames.

In an exemplary embodiment, the FDB specifies correspondence among MAC addresses, VLAN IDs, and Session IDs, and is built for the Ethernet bridging function by at least one of:

- pre-configuration of the UPF;
- receiving, from an SMF, the frame detection and forwarding rules with MAC address(es) and/or VLAN ID(s) for populating the FDB with the MAC address(es) and/or VLAN ID(s) via an N4 Session Setup procedure;
- learning and recording MAC address(es) and/or VLAN ID(s) of received frame(s) for populating the FDB with the MAC address(es) and/or VLAN ID(s);
- detecting and reporting MAC address(es) and/or VLAN ID(s) of received frame(s) to the SMF, and receiving, from the SMF, the MAC addresses and/or VLAN ID(s) for populating the FDB with the MAC address(es) and/or VLAN ID(s) via an N4 Session Modification procedure.

In an exemplary embodiment, the internal interface is a "5G VN Internal" interface.

Figure 12:
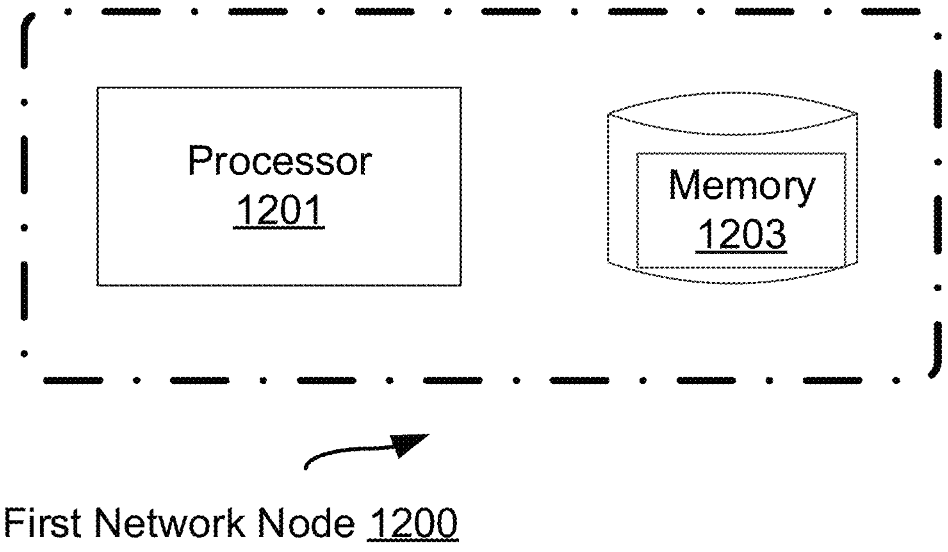
FIG. 12 schematically shows a structural block diagram of a first network node according to another exemplary embodiment of the present disclosure.

Hereinafter, a structure of a first network node according to another exemplary embodiment of the present disclosure will be described with reference to FIG. 12. FIG. 12 schematically shows a block diagram of a first network node 1200 according to an exemplary embodiment of the present disclosure. The first network node 1200 in FIG. 12 may perform the method 200 with reference to FIG. 2 and signaling sequence diagrams with reference to FIGS. 3 and 6. Accordingly, some detailed description on the first network node 1100 may refer to the corresponding description of the method 200 as shown in FIG. 2 in conjunction with the signaling sequence diagrams as shown in FIGS. 3 and 6, and thus will be omitted here for simplicity.

As shown in FIG. 12, the first network node 1200 includes at least one processor 1201 and at least one memory 1203. The at least one processor 1201 includes e.g., any suitable CPU (Central Processing Unit), microcontroller, DSP (Digital Signal Processor), etc., capable of executing computer program instructions. The at least one memory 1203 may be any combination of a RAM (Random Access Memory) and a ROM (Read Only Memory). The at least one memory 1203 may also include persistent storage, which, for example, can be any single one or combination of magnetic memory, optical memory, or solid state memory or even remotely mounted memory.

The at least one memory 1203 stores instructions executable by the at least one processor 1201. The instructions, when loaded from the at least one memory 1203 and executed on the at least one processor 1201, may cause the first network node 1200 to perform the actions, e.g., of the procedures as described earlier in conjunction with FIGS. 2, 3 and 6, and thus will be omitted here for simplicity.

Figure 13:
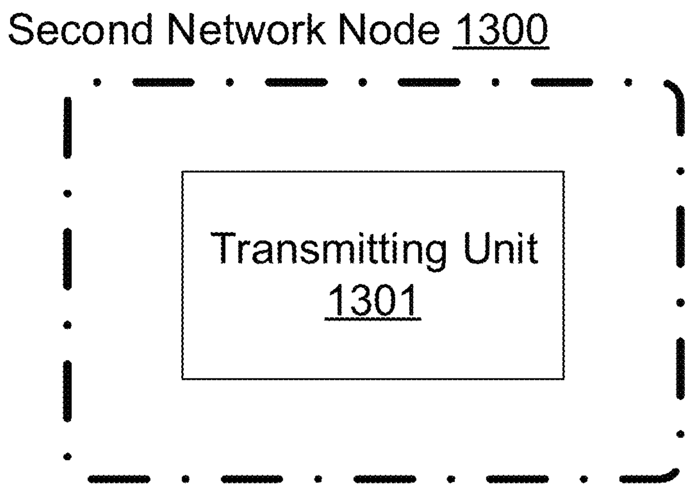
FIG. 13 schematically shows a structural block diagram of a second network node according to an exemplary embodiment of the present disclosure.

Hereinafter, a structure of a second network node according to an exemplary embodiment of the present disclosure will be described with reference to FIG. 13. FIG. 13 schematically shows a block diagram of the second network node 1300 according to an exemplary embodiment of the present disclosure. The second network node 1300 in FIG. 13 may perform the method 1000 as described previously with reference to FIG. 10 and signaling sequence diagrams with reference to FIGS. 3 and 6. Accordingly, some detailed description on the second network node 1200 may refer to the corresponding description of the method 1000 in FIG. 10 in conjunction with the signaling sequence diagrams as shown in FIGS. 3 and 6, and thus will be omitted here for simplicity.

As shown in FIG. 13, the second network node 1300 may include at least a transmitting unit 1301.

The transmitting unit 1301 may be configured to transmit, to a first network node capable of an Ethernet bridging function, an indication of establishing an Ethernet PDU session, which at least includes an indication of a PDN type being Ethernet, and information on frame detection and forwarding rules for the Ethernet PDU session, the frame detection and forwarding rules being used for the first network node to perform detection and forwarding operations on a frame, wherein the frame detection and forwarding rules includes at least one of:

a pair of first inbound detection and forwarding rules and first outbound detection and forwarding rules, and a pair of second inbound detection and forwarding rules and second outbound detection and forwarding rules, wherein the first inbound detection and forwarding rules include:

a first inbound detection rule of detecting and accepting a received frame with no VLAN ID, and a first inbound forwarding rule of assigning a default VLAN ID to the received frame with no VLAN ID and forwarding the frame assigned with the default VLAN ID to an internal interface of the first network node that is interfaced to the Ethernet bridging function, and a first outbound detection rule of detecting the frame with the default VLAN ID received from the internal interface and removing the default VLAN ID from the frame, and a first outbound forwarding rule of forwarding the detected frame to a destination interface; and wherein the second inbound detection and forwarding rules include:

a second inbound detection rule of detecting whether a received frame with a VLAN ID is accepted or rejected, and a second inbound forwarding rule of forwarding the accepted frame to the internal interface, and a second outbound detection rule of detecting the frame with the VLAN ID received from the internal interface, and a second outbound forwarding rule of forwarding the detected frame with the VLAN ID to a destination interface.

In an exemplary embodiment, the first inbound detection rule is a PDR, and is indicated by an Ethernet Packet Filter IE and a Source Interface IE, wherein the Ethernet Packet Filter IE includes a C-TAG IE indicates no VLAN ID and an Ethernet Filter Properties IE with an indicator indicating "Accepted", and the Source Interface IE indicates a source interface from which the frame is received.

In an exemplary embodiment, the C-TAG IE with its VID flag set to 0 indicates no VLAN ID, and the indicator set to 0 indicates "Accepted".

In an exemplary embodiment, the first inbound forwarding rule is an FAR, and is indicated by a Destination Interface IE and an Outer Header Creation IE, wherein the Outer Header Creation IE indicates the default VLAN ID for assigning to the received frame with no VLAN ID, and the Destination Interface IE indicates the Internal Interface to which the accepted frame is to be forwarded.

In an exemplary embodiment, the first outbound detection rule is a PDR, and is indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.

In an exemplary embodiment, the first outbound forwarding rule is an FAR, and is indicated by a Destination Interface IE, wherein the Destination Interface IE indicates the destination Interface to which the detected frame is to be forwarded.

In an exemplary embodiment, the second inbound detection rule is a PDR, and is indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.

In an exemplary embodiment, in each Ethernet Packet Filter IE of the list, a C-TAG IE indicates a VLAN ID, and an Ethernet Filter Properties IE includes an indicator, which is set to 1 to indicate "Rejected", or set to 0 to indicate "Accepted".

In an exemplary embodiment, the second inbound detection rule follows negotiation based on MVRP, and is indicated by a Source Interface IE and an Ethernet Packet Filter IE, wherein the Source Interface IE indicates a source interface from which the frame is received, and the Ethernet Packet Filter IE includes an Ethernet Filter Properties IE with an indicator set to 1 to indicate "Rejected" and a C-TAG IE is not present.

In an exemplary embodiment, the second inbound forwarding rule is an FAR, and is indicated by a Destination Interface IE, wherein the Destination Interface IE indicates the internal interface to which the accepted frame is to be forwarded.

In an exemplary embodiment, the second outbound detection rule is an PDR, and is indicated by a Source Interface IE indicates the internal interface from which the frame is received.

In an exemplary embodiment, the second outbound forwarding rule is an FAR, and is indicated by a Destination Interface IE, wherein the Destination Interface IE indicates the destination interface to which the detected frame with the VLAN ID is to be forwarded.

In an exemplary embodiment, the first network node is a UPF, and the second network node is an SMF, wherein the internal interface is an UPF internal interface, and the Ethernet PDU session for which the information on frame detection and forwarding rules are obtained includes at least one of:

an N6 Ethernet PDU session between an N6 interface and the UPF internal interface, an N3 Ethernet PDU Session between an N3 interface and the UPF internal interface, and an N19 Ethernet PDU Session between an N19 interface and the UPF internal interface.

In an exemplary embodiment, the Source Interface IE indicates a Core Interface for the N6 or N19 Ethernet PDU Session, and the Source Interface IE indicates an Access Interface for the N3 Ethernet PDU Session.

In an exemplary embodiment, the Destination Interface IE indicates a Core Interface for the N6 or N19 Ethernet PDU Session, and the Destination Interface IE indicates an Access Interface for the N3 Ethernet PDU Session.

In an exemplary embodiment, the N6/N3 Ethernet PDU session is established by the SMF via an N4 Session Setup procedure, wherein the transmitting further includes: transmitting, to the UPF, an indication of establishing the N6/N3 Ethernet PDU session, which at least includes the indication of the PDN type being Ethernet, and the information on frame detection and forwarding rules.

In an exemplary embodiment, the N19 Ethernet PDU session is established by the SMF via an N4 Session Setup procedure, wherein the transmitting further includes: respectively transmitting, to a pair of UPFs including the UPF, an indication of establishing the N19 Ethernet PDU session, which at least includes the indication of the PDN type being Ethernet, and the information on frame detection and forwarding rules.

In an exemplary embodiment, the indication of establishing the N19 Ethernet PDU session indicates to establish the N19 Ethernet PDU session per pair of UPFs for transmitting multiple VLANs in the N19 Ethernet PDU session, and is transmitted by the SMF once the SMF is respectively associated with the UPFs in the pair of UPFs.

In an exemplary embodiment, the information on frame detection and forwarding rules includes at least one of:

a pre-configured rule name referring to the frame detection and forwarding rules that are pre-configured in the UPF, or the at least one of the pair of first inbound detection and forwarding rules and first outbound detection and forwarding rules and the pair of second inbound detection and forwarding rules and second outbound detection and forwarding rules included in the frame detection and forwarding rules that are installed by the SMF.

In an exemplary embodiment, in the first inbound detection rule and the second inbound detection rule for the established N19 or N3 Ethernet PDU session, an Outer Header Removal IE set to "GTP-U/UDP/IPV4" indicates to remove a GTP header from the received frame before the received frame is detected.

In an exemplary embodiment, in the first outbound forwarding rule and the second outbound forwarding rule for the established N19 or N3 Ethernet PDU session, an Outer Header Creation IE set to "GTP-U/UDP/IPv4" indicates to add a GTP header to the detected frame before the detected frame is forwarded.

In an exemplary embodiment, the internal interface is a "5G VN Internal" interface.

Figure 14:
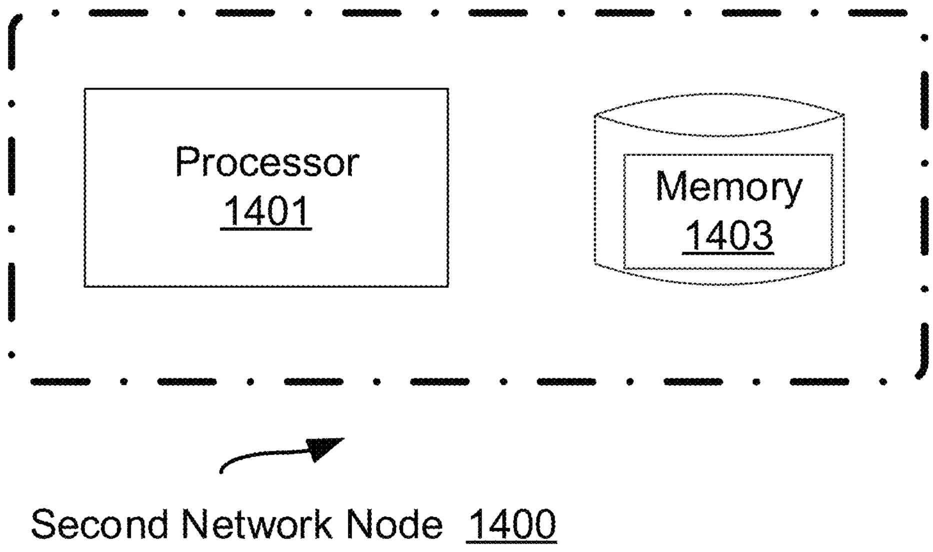
FIG. 14 schematically shows a structural block diagram of a second network node according to another exemplary embodiment of the present disclosure.

Hereinafter, a structure of a second network node according to another exemplary embodiment of the present disclosure will be described with reference to FIG. 14. FIG. 14 schematically shows a block diagram of a second network node 1400 according to an exemplary embodiment of the present disclosure. The second network node 1400 in FIG. 14 may perform the method 1000 as described previously with reference to FIG. 10 and signaling sequence diagrams with reference to FIGS. 3 and 6. Accordingly, some detailed description on the second network node 1400 may refer to the corresponding description of the method 1000 in FIG. 10 in conjunction with the signaling sequence diagrams as shown in FIGS. 3 and 6, and thus will be omitted here for simplicity.

As shown in FIG. 14, the second network node 1400 includes at least one processor 1401 and at least one memory 1403. The at least one processor 1401 includes e.g., any suitable CPU (Central Processing Unit), microcontroller, DSP (Digital Signal Processor), etc., capable of executing computer program instructions. The at least one memory 1403 may be any combination of a RAM (Random Access Memory) and a ROM (Read Only Memory). The at least one memory 1403 may also include persistent storage, which, for example, can be any single one or combination of magnetic memory, optical memory, or solid state memory or even remotely mounted memory.

The at least one memory 1403 stores instructions executable by the at least one processor 1401. The instructions, when loaded from the at least one memory 1403 and executed on the at least one processor 1401, may cause the second network node 1400 to perform the actions, e.g., of the procedures as described earlier respectively in conjunction with FIGS. 2 and 4~5, and thus will be omitted here for simplicity.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 1201 causes the first network node 1200 to perform the actions, e.g., of the procedures described earlier in conjunction with FIGS. 2, 3 and 6; or code/computer readable instructions, which when executed by the at least one processor 1401 causes the second network node 1400 to perform the actions, e.g., of the procedures described earlier respectively in conjunction with FIGS. 2, 3 and 6.

The computer program product may be configured as a computer program code structured in computer program modules. The computer program modules could essentially perform the actions of the flow illustrated in any of FIGS. 2, 3 and 6.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the present disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the present disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method performed by a first network node capable of an Ethernet bridging function, comprising:

obtaining information on frame detection and forwarding rules for an Ethernet Protocol Data Unit (PDU) session; and performing detection and forwarding operations on a frame according to the frame detection and forwarding rules, wherein the frame detection and forwarding rules comprise at least one of:

a pair of first inbound detection and forwarding rules and first outbound detection and forwarding rules, wherein the pair of first inbound detection and forwarding rules comprises:

a first inbound detection rule of detecting and accepting a frame with no Virtual Local Area Network (VLAN) Identifier (ID) and a first inbound forwarding rule of assigning a default VLAN ID to the frame and forwarding the frame, after the frame is assigned the default VLAN ID, to an internal interface of the first network node that is interfaced to the Ethernet bridging function, and a first outbound detection rule of detecting the frame, the frame being received from the internal interface, and removing the default VLAN ID from the frame, and a first outbound forwarding rule of forwarding the frame to a destination interface; and a pair of second inbound detection and forwarding rules and second outbound detection and forwarding rules, wherein the pair of second inbound detection and forwarding rules comprises:

a second inbound detection rule of detecting whether a frame with a VLAN ID is accepted or rejected, and a second inbound forwarding rule of, if the frame with the VLAN ID is accepted, forwarding the frame with the VLAN ID to the internal interface, and a second outbound detection rule of detecting the frame, the frame being received from the internal interface, and a second outbound forwarding rule of forwarding the frame with the VLAN ID to a destination interface.

2. The method of claim 1, wherein the first inbound detection rule is a Packet Detection Rule (PDR) and is indicated by an Ethernet Packet Filter Information Element (IE) and a Source Interface IE, wherein the Ethernet Packet Filter IE comprises a Customer Tag (C-TAG) IE indicating no VLAN ID and an Ethernet Filter Properties IE with an indicator indicating "Accept", and the Source Interface IE indicates a source interface from which the frame is received.

3. The method of claim 2, wherein the C-TAG IE with it's a VID flag set to a first binary value indicates no VLAN ID, and the indicator set to another binary value indicates "Accept".

4. The method of claim 1, wherein the first inbound forwarding rule is a Forwarding Action Rule (FAR) and is indicated by a Destination Interface IE and an Outer Header Creation IE, wherein the Outer Header Creation IE indicates the default VLAN ID for assigning to the frame received with no VLAN ID, and the Destination Interface IE indicates the internal interface to which the accepted frame is to be forwarded.

5. The method of claim 1, wherein
the first outbound detection rule is a PDR, and is indicated by an Ethernet Packet Filter IE, a Source Interface IE, and an Outer Header Removal IE, wherein the Ethernet Packet Filter IE indicates the default VLAN ID, the Source Interface IE indicates the internal interface from which the frame is received, and the Outer Header Removal IE set to "C-TAG" indicates that the C-TAG needs to be removed at egress.
6. The method of claim 1, wherein
the second inbound detection rule is a PDR, and is indicated by a Source Interface IE and a list of Ethernet Packet Filter IEs, wherein the Source Interface IE indicates a source interface from which the frame is received, and each of the Ethernet Packet Filter IEs indicates a VLAN ID to be rejected or accepted.
7. The method of claim 1, wherein the first network node is a User Plane Function (UPF),
wherein the internal interface is an UPF internal interface, and the Ethernet PDU session for which the information on frame detection and forwarding rules are obtained comprises at least one of:
an N6 Ethernet PDU session between an N6 interface and the UPF internal interface,
an N3 Ethernet PDU Session between an N3 interface and the UPF internal interface, and
an N19 Ethernet PDU Session between an N19 interface and the UPF internal interface.
8. The method (200) of claim 7, wherein:
the first outbound forwarding rule or the second outbound forwarding rule is an FAR, and is indicated by a Destination Interface IE, wherein the Destination Interface IE indicates the destination interface to which the detected frame with the VLAN ID is to be forwarded;
the Destination Interface IE indicates a Core Interface for the N6 or N19 Ethernet PDU Session, and
the Destination Interface IE indicates an Access Interface for the N3 Ethernet PDU Session.
9. The method of claim 7, wherein
the N6 Ethernet PDU session is established by the UPF based on local pre-configuration, and
the frame detection and forwarding rules for the N6 Ethernet PDU session are pre-configured in the UPF.
10. The method of claim 7, wherein
the N6/N3/N19 Ethernet PDU session is established by a Session Management Function (SMF), and
the method further comprises:
receiving, from the SMF, an indication of establishing the N6/N3/N19 Ethernet PDU session, which at least comprises an indication of a Packet Data Network 'PDN' type being Ethernet, and the information on frame detection and forwarding rules.
11. The method of claim 7, wherein
the N19 Ethernet PDU session is established by the SMF via an N4 Session Setup procedure, and
the method further comprises:
once the SMF is respectively associated with UPFs in a pair of UPFs including the UPF, receiving, from the SMF, an indication of establishing the N19 Ethernet PDU session per pair of UPFs for transmitting multiple VLANs in the N19 Ethernet PDU session.
12. The method of claim 7, wherein:
the Ethernet bridging function is implemented based on a Filter Database (FDB) in the UPF, and comprises at least one of:
a filtering operation function for detecting whether to accept or reject a frame,
a VLAN operation function for assigning/removing a VLAN ID to/from a frame, and
a forwarding operation function for forwarding L2 Ethernet traffic in a format of frames; and
the FDB specifies correspondence among MAC addresses, VLAN IDs, and Session IDs, and is built for the Ethernet bridging function by at least one of:
pre-configuration of the UPF;
receiving, from an SMF, the frame detection and forwarding rules with MAC address(es) or VLAN ID(s) for populating the FDB with the MAC address(es) or VLAN ID(s) via an N4 Session Setup procedure;
learning and recording MAC address(es) or VLAN ID(s) of the received frame(s) for populating the FDB with the MAC address(es) or VLAN ID(s);
detecting and reporting MAC address(es) or VLAN ID(s) of the received frame(s) to the SMF, and receiving, from the SMF, the MAC addresses or VLAN ID(s) for populating the FDB with the MAC address(es) or VLAN ID(s) via an N4 Session Modification procedure.
13. A method performed by a second network node, comprising:
transmitting, to a first network node capable of an Ethernet bridging function, an indication of establishing an Ethernet Protocol Data Unit (PDU) session, which at least comprises an indication of a Packet Data Network (PDN) type being Ethernet, and information on frame detection and forwarding rules for the Ethernet PDU session, the frame detection and forwarding rules being used for the first network node to perform detection and forwarding operations on a frame,
wherein the frame detection and forwarding rules comprise at least one of:
a pair of first inbound detection and forwarding rules and first outbound detection and forwarding rules, wherein the pair of first inbound detection and forwarding rules comprises:
a first inbound detection rule of detecting and accepting a frame with no Virtual Local Area Network (VLAN) Identifier (ID) and a first inbound forwarding rule of assigning a default VLAN ID to the frame and forwarding the frame, after the frame is assigned the default VLAN ID, to an internal interface of the first network node that is interfaced to the Ethernet bridging function, and
a first outbound detection rule of detecting the frame, the frame being from the internal interface, and removing the default VLAN ID from the frame, and a first outbound forwarding rule of forwarding the frame to a destination interface; and
a pair of second inbound detection and forwarding rules and second outbound detection and forwarding rules, wherein the pair of second inbound detection and forwarding rules comprises:
a second inbound detection rule of detecting whether a frame with a VLAN ID is accepted or rejected, and a second inbound forwarding rule of if the frame with the VLAN ID is accepted, forwarding the frame received with the VLAN ID to the internal interface, and
a second outbound detection rule of detecting, the frame, being received from the internal interface, and a second outbound forwarding rule of forwarding the frame with the VLAN ID to a destination interface.

14. The method of claim 13, wherein the first network node is a User Plane Function, UPF, and the second network node is a Session Management Function, SMF, wherein the internal interface is an UPF internal interface, and the Ethernet PDU session for which the information on frame detection and forwarding rules are obtained comprises at least one of:

an N6 Ethernet PDU session between an N6 interface and the UPF internal interface, an N3 Ethernet PDU Session between an N3 interface and the UPF internal interface, and an N19 Ethernet PDU Session between an N19 interface and the UPF internal interface.

15. The method of claim 14, wherein:

the first outbound forwarding rule or the second outbound forwarding rule is an FAR, and is indicated by a Destination Interface IE, wherein the Destination Interface IE indicates the destination Interface to which the detected frame is to be forwarded;

the Destination Interface IE indicates a Core Interface for the N6 or N19 Ethernet PDU Session, and the Destination Interface IE indicates an Access Interface for the N3 Ethernet PDU Session.

16. The method of claim 14, wherein the N19 Ethernet PDU session is established by the SMF via an N4 Session Setup procedure, wherein the transmitting further comprises:

respectively transmitting, to a pair of UPFs including the UPF, an indication of establishing the N19 Ethernet PDU session, which at least comprises the indication of the PDN type being Ethernet, and the information on frame detection and forwarding rules.

17. The method of claim 16, wherein the indication of establishing the N19 Ethernet PDU session indicates to establish the N19 Ethernet PDU session per pair of UPFs for transmitting multiple VLANs in the N19 Ethernet PDU session, and is transmitted by the SMF once the SMF is respectively associated with the UPFs in the pair of UPFs.

18. A first network node capable of an Ethernet bridging function, comprising:

at least one processor, and at least one memory, storing instructions which, when executed on the at least one processor, cause the first network node to:

obtain information on frame detection and forwarding rules for an Ethernet Protocol Data Unit (PDU) session; and perform detection and forwarding operations on a frame according to the frame detection and forwarding rules, wherein the frame detection and forwarding rules comprise at least one of:

a pair of first inbound detection and forwarding rules and first outbound detection and forwarding rules, wherein the pair of first inbound detection and forwarding rules comprises:

a first inbound detection rule of detecting and accepting a frame with no Virtual Local Area Network (VLAN) Identifier (ID) and a first inbound forwarding rule of assigning a default VLAN ID to the frame and forwarding the frame, after the frame is assigned with the default VLAN ID, to an internal interface of the first network node that is interfaced to the Ethernet bridging function, and a first outbound detection rule of detecting the frame, the frame being received from the internal interface, and removing the default VLAN ID from the frame, and a first outbound forwarding rule of forwarding the frame to a destination interface; and a pair of second inbound detection and forwarding rules and second outbound detection and forwarding rules, wherein the pair of second inbound detection and forwarding rules comprises:

a second inbound detection rule of detecting whether the frame with a VLAN ID is accepted or rejected, and a second inbound forwarding rule of, if the frame with the VLAN ID is accepted, forwarding the frame with the VLAN ID to the internal interface, and a second outbound detection rule of detecting the frame with the VLAN ID, the frame with the VLAN ID being received from the internal interface, and a second outbound forwarding rule of forwarding the frame with the VLAN ID to a destination interface.

19. A non-transitory computer readable storage medium having computer program instructions stored thereon, the computer program instructions, when executed by at least one processor, causing the at least one processor to perform the method according to claim 1.

20. A non-transitory computer readable storage medium having computer program instructions stored thereon, the computer program instructions, when executed by at least one processor, causing the at least one processor to perform the method according to claim 13.

* * * * *